US012302781B2

United States Patent
Bösenberg et al.

(10) Patent No.: US 12,302,781 B2
(45) Date of Patent: May 20, 2025

(54) METHOD FOR CONTROLLING THE OPERATION OF A MACHINE FOR HARVESTING ROOT CROP

(71) Applicant: Grimme Landmaschinenfabrik GmbH & Co. KG, Damme (DE)

(72) Inventors: Daniel Bösenberg, Emsdetten (DE); Wolfram Strothmann, Osnabrück (DE)

(73) Assignee: Grimme Landmaschinenfabrik GmbH & Co. KG, Damme (DE)

( * ) Notice: Subject to any disclaimer, the term of this patent is extended or adjusted under 35 U.S.C. 154(b) by 122 days.

(21) Appl. No.: 17/286,877

(22) PCT Filed: Nov. 5, 2019

(86) PCT No.: PCT/EP2019/080264
§ 371 (c)(1),
(2) Date: Apr. 20, 2021

(87) PCT Pub. No.: WO2020/094655
PCT Pub. Date: May 14, 2020

(65) Prior Publication Data
US 2021/0378170 A1    Dec. 9, 2021

(30) Foreign Application Priority Data

Nov. 7, 2018    (DE) ..................... 10 2018 127 845.4

(51) Int. Cl.
*G06V 10/20*    (2022.01)
*A01D 33/04*    (2006.01)
(Continued)

(52) U.S. Cl.
CPC ........... *A01D 33/04* (2013.01); *G06V 10/255* (2022.01); *G06V 10/56* (2022.01); *G06V 20/10* (2022.01);
(Continued)

(58) Field of Classification Search
CPC ............ A01D 33/04; A01D 2033/005; G06V 10/255; G06V 10/56; G06V 20/10; G06V 20/68; G06V 2201/06
See application file for complete search history.

(56) References Cited

U.S. PATENT DOCUMENTS 6,119,442 A    9/2000    Hale
2007/0056258 A1*    3/2007    Behnke .............. A01D 41/1277
56/10.2 R
(Continued)

FOREIGN PATENT DOCUMENTS

CN    102424257 A    *    4/2012
CN    104781654 A        7/2015
(Continued)

OTHER PUBLICATIONS

Schuster, Measuring volumetric flow rate of grains through a crop harvester to improve crop yield estimation accuracy, 2016; Iowa State University Agricultural and Biosystems Engineering, pp. 1-138. (Year: 2016).*

(Continued)

*Primary Examiner* — Kathleen M Broughton
(74) *Attorney, Agent, or Firm* — Husch Blackwell LLP

(57) ABSTRACT

A method is provided for controlling the operation of a machine for harvesting root crop and/or for separating root crop from the rest of the harvested material comprising extraneous materials. At least one optical image-capturing unit captures at least one test image of at least one part of the harvested material which is moved along relative to a machine frame by means of at least one conveyor element. An evaluation device generates, on the basis of a test data set which is generated using the test image or formed thereby, a separating device setting signal for setting at least one operating parameter of a separating device of the machine.

30 Claims, 15 Drawing Sheets

(51) Int. Cl.
*G06V 10/56* (2022.01)
*G06V 20/10* (2022.01)
*A01D 33/00* (2006.01)
*G06V 20/68* (2022.01)

(52) U.S. Cl.
CPC ........ *A01D 2033/005* (2013.01); *G06V 20/68* (2022.01)

(56) References Cited

U.S. PATENT DOCUMENTS

| | | | |
|---|---|---|---|
| 2014/0050364 A1* | 2/2014 | Brueckner | G06V 20/68 382/110 |
| 2015/0224544 A1* | 8/2015 | McGloughlin | B07C 5/342 209/577 |
| 2016/0050845 A1* | 2/2016 | Nilson | A01D 17/10 171/126 |
| 2017/0325402 A1* | 11/2017 | Craig | A01D 45/10 |
| 2018/0042176 A1* | 2/2018 | Obropta | G06T 7/55 |
| 2018/0047177 A1* | 2/2018 | Obropta | G06T 17/20 |
| 2018/0084719 A1 | 3/2018 | Neitemeier et al. | |
| 2018/0100810 A1* | 4/2018 | Sahu | G01N 21/94 |
| 2018/0100844 A1* | 4/2018 | Hilscher | G01N 33/025 |
| 2022/0394922 A1* | 12/2022 | Gururajan | A01D 43/087 |

FOREIGN PATENT DOCUMENTS

| | | | | |
|---|---|---|---|---|
| CN | 204929582 U | * | 1/2016 | |
| CN | 107123115 A | * | 9/2017 | ........... G06T 7/0004 |
| DE | 153833 A1 | | 3/1982 | |
| DE | 220208 A1 | | 3/1985 | |
| EP | 0699379 A2 | | 3/1996 | |
| EP | 1083007 A2 | | 3/2001 | |
| EP | 1763988 A1 | | 3/2007 | |
| JP | H11114504 A | * | 4/1999 | |
| JP | 2003304850 A | * | 10/2003 | |
| JP | 2015529154 A | | 10/2015 | |
| JP | 2018001115 A | | 1/2018 | |
| WO | 2014037290 A1 | † | 3/2014 | |
| WO | WO 2014/037290 | † | 3/2014 | |
| WO | WO-2017194399 A1 | * | 11/2017 | ......... G06K 9/00671 |
| WO | WO-2017212267 A1 | * | 12/2017 | ........... A01B 79/005 |
| WO | WO-2018068143 A1 | * | 4/2018 | ............. A01G 13/00 |

OTHER PUBLICATIONS

Mallahi, Ahmad Ali et al., "Improving the Conditions of Potato Production by the Automation of Potato Harvesting Tasks Using Machine Vision", In: Potatoes: Production, Consumption and Health Benefits, 2012, p. 83-97, ISBN: 978-1-692100-703-6.

Molema, Geert-Jan et al., "Using Image Processing to Measure Potato Yield", Article: Agricultural Mechanisation, Apr. 2003, p. 58-61.

Molema, G.J., Hofstee, J.W., 2003, Aardappelopbrengst meten met beeldverwerking kan. Landbouwmechanisatie, Apr. 2003, pp. 28-29.†

Mallahi, A. A., Kataoka, T., 2012, Improving The Conditions Of Potato Production By The Automation Of Potato Harvesting Tasks Using Machine Vision. Potatoes: Production, Consumption and Health Benefits, ISBN: 978-1-62100-703-6, Nova Science Publishers, Inc., pp. 83-97.†

\* cited by examiner
† cited by third party

METHOD FOR CONTROLLING THE OPERATION OF A MACHINE FOR HARVESTING ROOT CROP

CROSS REFERENCE

This application claims priority to PCT Application No. PCT/EP2019/080264, filed Nov. 5, 2019, which itself claims priority to German Patent Application No. 10 2018 127845.4, filed Nov. 7, 2018, the entirety of both of which are hereby incorporated by reference.

FIELD OF THE INVENTION

The invention relates to a method for controlling the operation of a machine for harvesting root crop and/or for separating root crop from further harvested material, and to the machine. In the method, at least one optical image-capturing unit captures at least one test image of at least one part of the harvested material which is moved along relative to a machine frame by means of at least one conveyor element.

The test image shows harvested material which has been previously picked up by the machine for harvesting root crop or fed thereto. As part of the machine, the conveyor element serves here to move the harvested material within the machine, wherein at least some of the harvested material is in direct contact with the conveyor element here.

BACKGROUND

Laid-open patent application US 2018/0047177 A1 discloses a method in which a captured test image is used to calculate a speed of the conveyor element. The actual speed of the conveyor element is subsequently adapted on the basis of the calculated speed.

It is disadvantageous in the known methods of the generic type that, depending on the harvesting conditions, significant damage occurs to the root crop or to a relatively large quantity of extraneous materials among root crop which are unloaded from the machine. It is therefore also generally proposed in US 2018/0047177 A1 to change the harvesting rate or one or more configurations of the machine in accordance with a server-based evaluation of three-dimensional data of the harvested material which is recorded by the sensors of the machine.

BRIEF SUMMARY OF THE INVENTION

The object of the present invention is to provide a method in which the non-damaging handling of the root crop is improved, wherein as large a portion of extraneous materials as possible is separated from the root crop.

According to the invention, the object is achieved by means of a method of the generic type, in which the evaluation device generates, on the basis of a test data set which is generated using the test image or formed thereby, a separating device setting signal for setting at least one operating parameter of a separating device of the machine.

The machine is a self-propelled or towed vehicle for harvesting root crop, in particular potatoes, beets, carrots or chicory. While the method is being carried out, the machine is moved, in particular in the direction of rows, in particular cultivation ridges of the root crop to be harvested, and these are picked up from the ground as part of the harvested material in a continuous process. After the harvested material has been picked up, at least some of the harvested material, in particular root crop and/or extraneous materials, is at least partially moved along relative to the machine frame by the at least one conveyor element. In particular, the conveyor element is embodied in a circulating fashion, and as a conveyor belt, preferably as a screening belt or as a rotating screening star.

Alternatively, the machine can also be a machine for separating root crop from extraneous materials of the harvested material, e.g. from clods, stones or soil.

The separating device is, with any individually adjustable separating elements, part of the machine and preferably interacts with one or more conveyor elements. Alternatively, the separating device is part of the conveyor element, is at least also formed by it (e.g. in the case of screening belts which are provided with shaking devices) or also forms the one or more conveyor elements (e.g. in the case of roller soil removers). During operation, a movement of the harvested material relative to the separating device applies impetus to at least one component of the harvested material, in particular to the root crop or to the extraneous materials. The separating device is provided, for example, in the form of a roller soil remover, in particular with rotating separating elements in the form of rollers, wherein different components of the harvested material are at least not moved in the same direction by the separating device.

The optical image-capturing unit is arranged in particular above the conveyor element in a positionally fixed fashion on the machine and is directed at the conveyor element, and therefore during operation at a stream of harvested material, or a component thereof, in particular root crop or extraneous materials, which is located between the image-capturing unit and the conveyor element. The method according to the invention is carried out with the machine in particular during the harvesting or separation process, and is preferably repeated here.

The test image is in particular a multidimensional, preferably two-dimensional, representation in which at least part of the harvested material is represented with root crop, extraneous materials and/or the conveyor element. The test data set is either already generated by the image-capturing unit or by the evaluation device, on the basis of the test image captured by the image-capturing unit. Alternatively, the test data set can be formed by the test image itself. This applies in particular to image-capturing units whose test images are already in a format which is suitable for the subsequent analysis in the evaluation device. The test data set is in particular a data set which is produced by processing, for example filtering and/or other representations and is at least temporarily present in the system and whose information, e.g. color information in the form of one or more color values, is evaluated in the evaluation device. Said data set can be present e.g. as an image file, table, matrix or vector field. The test image or the test data set which is already produced in the image-capturing unit is transmitted to the evaluation device by the image-capturing unit. The optical image-capturing unit is embodied in particular as a digital photo camera or video camera for the two-dimensional capturing of the test image or as a line scan camera. If reference is made below to the test image in conjunction with the processing of the image information in the evaluation device, this may involve the test data set in this context.

The evaluation device serves to evaluate the test data set. The evaluation device comprises at least one processor and is embodied either as a central computing unit or as a decentralized system comprising at least one processor and at least one memory with different positions on components of the machine. The system is therefore a local one for carrying out any evaluations directly in situ and making the results directly available.

The operating parameter is a variable which relates to the geometry of the separating device or a separating element thereof, the position or orientation relative to the machine frame or to the conveyor element, a speed of the separating device and/or a motor power level. The operating parameter can be used to set the way in which or the extent to which the separating device interacts with the harvested material or at least a component thereof. In particular, by varying the operating parameter it is possible to vary how much extraneous materials remain with the root crop downstream of the separating device, with respect to the conveying line by which the root crop are to be conveyed within the machine. The operating parameter is in particular independent of a conveying speed of the conveyor element, which serves to convey at least the root crop while they are resting on the conveyor element, and to move them in the same direction as the conveyor element.

The operating parameter defines how forcefully the separating device behaves during the separation of root crop and extraneous materials. When the forcefulness is too low, an excessively large portion of the extraneous materials is not separated off from the root crop. When the forcefulness is too high, not only extraneous materials but also root crop are damaged or separated off and the yield is reduced. By generating the separating device setting signal and in particular by transmitting it to a separating device control device, the operating parameter is preferably set according to the harvested material or the part of the harvested material which is represented with the test image. The separating device control device increases or reduces, in particular, the operating parameter by means of the separating device setting signal. The separating device control device outputs for this purpose in particular an electrical signal, preferably to an actuator. In particular a hydraulic pressure, a pneumatic pressure, a current, a voltage, a force and/or a torque is adjusted for driving or resetting the separating device or the operating parameter by means of the separating device control device, in particular by means of the electrical signal. In this case, the separating device control device is in particular part of the same computing unit as the evaluation device.

The method makes it possible to achieve continuous optimization of the operation of the separating device. In particular, the forcefulness of the separating element or of the separating device can be optimized continuously, and therefore it is possible to achieve both non-damaging handling of the root crop and simultaneously effective separation of extraneous materials from the harvested material.

In particular, in order to provide the separating device setting signal, the evaluation device evaluates the test data sets locally on the machine or on a tractor vehicle which is directly connected thereto. As a result, virtually instantaneous control is possible when an undesired state is detected at a separating device, and blockages or damage are/is correspondingly avoided.

In one advantageous development of the method according to the invention, the evaluation device calculates at least one first portion of the test image which is formed by at least one image area. The at least one image area at least partially represents a defined component of the harvested material or of the machine. In particular a cleaning characteristic value is calculated on the basis of the first portion.

Before the first portion is calculated, the component which is represented statistically by the first portion is predefined. The test image and/or the test data set are subdivided in particular into a plurality of image areas of preferably equal size. The image areas which at least partially show the component, together form the first portion. The portion is in particular a portion of those image areas of the entire image areas which at least partially show the component, wherein the first portion is formed using a ratio of numbers of image areas or using their entire surfaces.

The first portion is a measure of the extent of image areas which represent the component and therefore a measure of the density of the component in the field of vision of the image-capturing unit or of that portion of the test image which is being considered. The part is in particular at least partially a component of a root crop, as a result of which the first portion at least approximately indicates a concentration of root crop. An image area is assessed as representing the part, and classified as being associated with the first portion, in particular when at least 50% to 100% of its area shows the part. Alternatively, the portion can result from summing the individual pixels representing the part. In particular, the at least one image area can also be classified as being associated only proportionally with the first portion or preferably respectively classified as being partially associated with different portions. This is advantageous in particular if it is not possible to make an unambiguous assignment of the image area to a corresponding part within the scope of the preferably model-based classification method. In this case, probabilities for the assignment to different portions are preferably determined. The image areas are particularly preferably classified as being proportionally or partially associated with different portions in accordance with the probabilities. As a result, the ratios of the parts to one another is represented more precisely.

The calculation of the first portion calculates a characteristic value which characterizes in particular the composition of the harvested material. On this basis, the operating parameter can be particularly advantageously controlled, since the cleaning performance of the conveyor element or of the separating device comprising the conveyor element is highly dependent on the composition of the harvested material. In the case where the first portion characterizes a concentration of extraneous materials, the operating parameter with an increasing first portion can preferably be varied in order to generate a relatively large separating effect or separating performance. The cleaning characteristic value is preferably calculated at least using the first portion or is equal to the first portion.

The at least one image area which forms the first portion is preferably identified, in particular on the basis of a test data subset generated using the image area, as showing the defined part. In particular, the image area is identified on the basis of a test value contained in the test image and/or in the test data subset, preferably color information. The color information comprises in particular black values, white values, gray values and/or color channel values of a color space.

The test data subset, the test value and the color information are preferably classified by a, in particular model-based, statistical classification method. An image area is accordingly classified as being associated with the first portion in particular when the result of the classification method is assigned to the defined part of the harvested material or of the machine. The classification method uses in particular a neural network, a random forest, a Bayesian classifier, a support vector machine and/or a decision tree. Applying the classification method makes the result of the calculation of the first portion, in particular of different portions, particularly robust and informative in respect of the composition of the harvested material.

The test value or the color information is particularly preferably compared with one or more reference values or reference ranges and on this basis an image area is either classified as being associated with the first portion or not. The reference image is preferably to be captured, like the test image, by means of the optical image-capturing unit, wherein a user has to mark in particular different parts of the reference image as showing different components. This form of differentiation permits particularly reliable identification of a respective component in the test image. At least one of the test values of the test data subset, which in particular includes the color information, is particularly preferably compared with at least one reference value, and an image area is added to the first portion in particular when at least the at least one test value of the test data subset lies within an assigned reference value range. This reference value range is limited in particular by a maximum value and by a minimum value, wherein, in order to classify the image area as being associated with the first portion, different test values must preferably lie in respectively assigned reference value ranges.

In one advantageous refinement of the invention, when exemplary image areas, which can be classified as being associated with the first portion, of the reference image are input, the evaluation device automatically develops, or automatically further develops, a model on which the classification method is based. Alternatively or additionally, the evaluation device automatically calculates or changes the at least one reference value range when exemplary image areas, which can be classified as being associated with the first portion, of a reference image are input. In particular, the reference values, reference value ranges and the model or model parameters thereof therefore at least do not have to be completely manually predefined by the user. Instead, to activate the evaluation device it is sufficient to input at least one exemplary image area which shows the component. By using the image area, the evaluation device determines the at least one reference value, the at least one reference value range and the model or model parameters thereof automatically. The evaluation device therefore sets itself largely automatically to different application cases. The higher the number of image areas which are input here, the more precisely the reference values and the reference value ranges and the model or model parameters thereof can be determined.

The method is pretty robust when the image areas which are input show the component under different brightness conditions and/or soil conditions. The method can therefore also be used reliably under different application conditions. The evaluation device particularly preferably adapts the initial reference value or the reference value ranges during the repeated execution of the method, if appropriate with exemplary identification of relevant components by the operator, on the basis of which training data for the algorithm can be represented.

In particular, using further sensors such as brightness sensors for measuring the ambient brightness, which the evaluation device assigns essentially simultaneously to the recorded test data sets, the evaluation device automatically expands the scope of the reference data. Alternatively or additionally, the user of the method, i.e. in particular the driver or operator of the machine or of a machine coupled thereto, has the possibility of manually marking the at least one component on visualized test images, in order to expand the scope of the reference data of the evaluation device.

Therefore, on the basis of the details specified by the user or on the basis of data stored in the valuation device, said device can differentiate e.g. potatoes, weeds, stones, loose earth and clods and calculate respective portions.

The method according to the invention is, with the exception of the inputting of any training data present in the form of the marking of components, executed automatically after its start. This facilitates control of the machine for the driver or operator.

The image areas which form the first portion are preferably additionally identified on the basis of image data subsets which are generated using respectively adjacent image areas or formed by means thereof. In particular, color information, in particular comprising black values, white values and/or gray values, in turn included in the test data subsets, are used for this. The assessments of the image areas are therefore not carried out solely using the data assigned thereto, but rather additionally further data which is assigned to the surrounding image areas is used. As a result, brightness profiles and/or color profiles can be determined, and thus the identification can be carried out on a wider data basis.

The different image areas are preferably weighted differently in the calculation of the first portion. The contribution of the image areas which form the first portion is therefore different. As a result, it is possible for the first portion not to be calculated solely using the perspective representations of the test image but rather in particular to give a higher weighting to image areas which show a component of the harvested material which is further away from the image-capturing unit as image areas which show a component which is closer to the image-capturing unit. As a result, a first part from which perspectives are removed can be formed, and therefore an image of the composition of the harvested material on the conveyor element which is particularly close to reality can be obtained.

The entire test image or a coherent test image part is preferably divided into partial image areas. The partial image areas in particular each comprise the same number of pixels of the test image, preferably precisely one pixel. The test image part is a part or excerpt of the test image which comprises a plurality of partial image areas. For the calculation of the first portion, in particular only the image areas which show this portion and are associated with the test image part are taken into account. For this purpose, the test image part is in particular defined in such a way that it represents sensitive zones, which are to be monitored, within the machine. The image area which forms the first portion therefore comprises in particular a plurality of partial image areas of a test image part.

The test image or the test image part is in particular divided into a grid of a plurality of partial image areas, which are each preferably rectangular. When the partial image areas are formed by precisely one pixel, a particularly large database is provided for the assessment of the state of the harvested material with respect to its individual components, and particularly sensitive control of the operating parameter is therefore made possible. At the same time, the data quantities which are usually supplied by conventional 2D digital cameras with a maximum of several million pixels can readily be processed in close to real-time conditions by an evaluation device which is equipped with one or more current processors.

The test image preferably comprises a plurality of test image parts for which the evaluation device respectively calculates a first portion, in particular a plurality of portions of image areas, wherein the test image parts preferably represent harvested material from different conveyor elements which convey away from a separating device. The test image parts thus show in particular different sections of the same conveyor element, one of which is arranged upstream of a separating device or of a separating element thereof in the conveying direction, and a further one of which is arranged downstream of the separating device or of a separating element thereof. Alternatively, the test image parts show different conveyor elements which represent alternative conveying paths for different components of the harvested material (for example one conveyor element for cleaned root crop, one conveyor element for extracted extraneous materials). The cleaning performance or separating performance of the associated separating device can be evaluated particularly comprehensively through the calculation of the first portion for these different test image parts. In particular, the first portion of a stream of harvested material bound for the separating device can be compared with the first portion of a stream of root crop coming from the separating device and thus the effectiveness of the separating device can be determined. Alternatively, the composition of the harvested material of the conveyor elements which adjoin a separating device and therefore convey away from it is preferably determined once for separated-out harvested material and once for harvested material which is to be conveyed onward. In particular, the operating parameter is set in accordance with the effectiveness of the separating device. Likewise, the test image parts which are represented or present in respective test data sets can show part of a conveyor element upstream of a separating element or deflection element of the separating device and part of the conveyor element downstream of the separating element or deflection element. Insofar as the image analysis reveals that excessively large portions of e.g. root crop appear downstream of a deflection element in an undesired area, this deflection element can be positioned differently, e.g. at a lower point above the conveyor element, which improves the separating performance.

In an advantageous embodiment of the invention, the test image parts preferably show different conveyor elements downstream of a separating element, in particular one conveyor element for carrying away a mixture of root crop and one conveyor element for carrying away extraneous materials downstream of the same separating device. A first portion of a component, for instance of root crop, is preferably determined for both test image parts in this case. Alternatively, different portions are calculated for the different test image parts. In this way, for example one portion of extraneous materials in the outgoing stream of root crop mixture can be compared with a portion of root crop in a stream of extracted extraneous materials, and on the basis thereof a separating element which is included in the separating device can be set with respect to its position in relation to the conveyor element or with respect to its speed.

The image areas which form the first portion show root crop or parts thereof and image areas which form a second portion show extraneous materials or parts thereof. Therefore, the evaluation device calculates at least two different portions. The evaluation device particularly preferably calculates at least four portions, a first portion for root crop, a second portion for weed components, a third portion for earth and a fourth portion for damaged areas. The sum of the portions is in particular 1. Alternatively, the first portion can also be a portion of extraneous materials, the second portion a portion of root crop etc. Additionally or alternatively, portions for clods and/or stones are preferably calculated.

Alternatively or additionally, in a further development according to the invention at least two image-capturing units and at least two conveyor elements are provided, wherein the first image-capturing unit captures a first test image of a part of the harvested material which is conveyed away from a separating device by means of the first conveyor element, the second image-capturing unit captures a further test image of a part of the harvested material which is conveyed away from the separating device by means of the second conveyor element, and the separating device setting signal is generated on the basis of at least one of the test data sets which are formed on the basis of at least one of the two test images, and preferably on the basis of both test images, or which are generated on the basis of said images. The test data sets are evaluated here in particular in relation to the respective portions, as respectively described above or below.

A plurality of portions in the calculation of the evaluation device make it possible to obtain a more precise picture of the composition of the harvested material and/or the allocation of the conveyor element. As an alternative to identifying image areas using limiting values, all the image areas of the test image or of a part of the test image are necessarily assigned to a portion. In this context, preferably a degree of correspondence between test data subsets calculated using the image areas and reference data subsets is assessed, and each image area is assigned to the portion for which the correspondence is greatest.

In one advantageous refinement of the invention, the cleaning characteristic value is determined by means of a deviation, calculated by the evaluation device, of the first portion from a threshold value. In particular, the threshold value characterizes an optimum utilization factor of the conveyor element, wherein a deviation from a defined value thereof triggers a change in the operating parameter. The cleaning characteristic value is based in particular on a plurality of portions and preferably further data, in particular sensor data.

In one advantageous refinement of the invention, the separating device setting signal is calculated using a plurality of cleaning characteristic values which are, in particular, calculated in chronological succession, or at least one previously calculated cleaning characteristic value is input into the calculation of the cleaning characteristic value. In particular, a sliding average of the cleaning characteristic value is calculated on which the separating device setting signal is based or smoothing of the cleaning characteristic value curve takes place, in particular using a low-pass filter. The method according to the invention can be used in a manner which is particularly free from disturbances and thus particularly robustly by means of these measures.

In one advantageous refinement of the invention, at least one further sensor transmits sensor data to the evaluation device, which data is input into the calculation of the separating device setting signal. The sensor is in particular a sensor, preferably a tactile sensor or an ultrasonic sensor, for measuring a layer thickness of the harvested material on the conveyor element, a sensor for measuring a drive power level, for example in the form of a pressure sensor for measuring a hydraulic oil pressure and/or a rotational speed sensor in particular for measuring a rotational speed of a conveyor element drive. In particular, slip of the conveyor element is determined using the rotational speed sensor and transmitted in the form of sensor data to the evaluation device. Further information can be input into the calculation of the separating device setting signal by means of a moisture sensor.

By virtue of this further information which is present in the sensor data and goes beyond that which is made available on the basis of the test image, the evaluation device is provided with a significantly more precise picture of the cleaning situation in the region of the conveyor element, as a result of which the operating parameter can in turn be influenced in a way which is matched better thereto.

The evaluation device preferably either triggers an increase or a reduction in the operating parameter by means of different separating device setting signals. In particular, the evaluation device or the separating device control device comprises a fuzzy controller, a PID controller or three-point controller, as a result of which it is possible to trigger, as alternatives to one another, processes of increasing, reducing or retaining the value of the current operating parameter. An increase is triggered in particular when the cleaning characteristic value exceeds a predefined first threshold value, a reduction is correspondingly triggered if the cleaning characteristic value undershoots a predefined second threshold value.

The operating parameter is preferably a distance between two conveyor elements, wherein, owing to the distance, the conveyor elements can function together as a separating device, or a distance between a separating element of the separating device and a conveyor element or between the separating device and a conveyor element. In particular, the operating parameter is a distance between two conveying rollers of a roller table which are rotating during operation, between which earth is screened. Alternatively, the operating parameter is a distance between a conveyor element which is embodied as a screening belt and a separating element which is embodied as a deflection roller, wherein the separating element extends transversely over the conveyor element and brings about lateral deflection of the root crop from the conveyor element. In this context, during operation, the deflection roller rotates about a rotational axis which, in a plan view of the conveyor element, is at an angle of less than 90° with respect to the conveying direction of the conveyor element. The separating element is alternatively embodied as a finger web which circulates during operation and is located above the conveyor element and whose outwardly projecting fingers mesh during operation through the harvested material arranged on the conveyor element. Again alternatively, the separating element is embodied as a stripping device which does not rotate during operation and which is arranged above a coarse weed belt which interacts with the screening belt and causes root crop to be stripped from weeds which have accumulated on the coarse weed belt. The distance can be respectively set in particular by a hydraulic or mechanical adjustment device, which permits the forcefulness of the separating element of the separating device in its interaction with the conveyor element or the separating performance of the conveyor elements to be changed particularly easily.

Alternatively, the operating parameter is a penetration depth of at least one grubbing coulter of the machine into the ground. As a result, the quantity of extraneous materials in the harvested material can be easily influenced.

As an alternative to or in addition to the above, the operating parameter is a separating speed, in particular a circulating speed or rotational speed, of the separating device or of a separating element of the separating device. In particular, the separating speed is a circulating speed of the finger web described above or a rotational speed of the deflection roller described above. Alternatively, the separating speed is a circulating speed of a separating device e.g. in the form of a fine weed belt, which is positioned at an angle and conveys extraneous materials upward during operation and is operated in such a way that as far as possible extraneous materials are conveyed upward and root crop roll down counter to the direction of movement of the section of the separating device which faces them.

The operating parameter is preferably alternatively embodied as an attitude angle of the conveyor element, of the separating device, i.e. of at least one separating element of the separating device. In particular, the operating parameter is the attitude angle of the separating device which is also referred to as a fine weed elevator. The attitude angle changes the inclination of the conveying plane of a fine weed belt of the separating device relative to a horizontal and therefore sets the forcefulness of the separating device.

In an alternative advantageous refinement of the invention, the operating parameter brings about a change in an air flow speed or in an air mass throughput rate over time, wherein the corresponding separating device separates on the basis of air flow. In this context, a motor power level, e.g. represented by a motor rotational speed, can be the corresponding operating parameter. The air in turn brings about the separation of root crop and extraneous materials, in particular weeds are blown out from a stream of harvested material and therefore removed. The operating parameter in the case of such an air separating device which can also be used in particular in a stationary fashion is preferably a rotational speed of an associated blower or the attitude angle of an associated assembly in the form of an air deflector, which e.g. divides an air stream into a main air stream and a transverse air stream.

In one advantageous refinement of the method according to the invention, in particular a plurality of the above-mentioned operating parameters are set by the same separating device setting signal or different separating device setting signals. A control system for this can be stored in the evaluation device, which system produces corresponding signals for the desired increased or reduced separating performance of the respective separating device for the respective adjustable variables.

Preferably, after the triggering of a change in an operating parameter, no further change in an operating parameter is triggered for a defined time period or a defined conveying distance of the conveyor element. This relates in particular only to the same operating parameter and/or at least one operating parameter of at least one separating device which is arranged downstream during operation. This ensures that over-regulation of the separating element does not occur, and each change in an operating parameter is based on a sound data basis which already takes into account a preceding change in an operating parameter.

The separating element-setting signal is preferably transmitted in a wired fashion, particular by means of CAN bus or ethernet, or in a wireless fashion, to the separating element control device, wherein the separating device setting is preferably to be enabled in advance by an operator by means of an input at an interface. As a result, already existing or at least established systems can be used for transmitting communications for setting the separating element, and the reliability of the method can be increased in particular by virtue of the fact that a resulting setting or the setting which is to be made for the separating device is displayed to an operator instead of the automatic setting thereof in particular in the driver's cab and said operator has to enable it at an interface using a corresponding input.

The object is furthermore achieved according to the invention by means of a machine for harvesting root crop and/or for separating root crop from further extraneous materials in the harvested material. The machine has a machine frame, a conveyor element, an image-capturing unit, a separating device and an evaluation device. The machine is designed to carry out the method as described above or below.

The evaluation device preferably comprises a graphic processor unit, in particular a GPU—(Graphical Processing Unit) or GPGPU—(General Purpose Graphical Processing Unit) and/or an FPGA—(Field Programmable Gate Array) based processor unit. This embodiment of the evaluation device makes it possible to evaluate the test data set in a way which is particularly economical in terms of resources and, in particular on a local basis. Of course, the evaluation device which is embodied as an EDP device has further customary means e.g. for the power supply, interfaces and working memory.

In one advantageous refinement of the invention, the machine has at least one sensor which is coupled to the evaluation device, in particular a tactile sensor or ultrasonic sensor for measuring a layer thickness of the harvested material on the conveyor element, a sensor for measuring a drive power level, for example a pressure sensor for measuring a hydraulic oil pressure, and/or a rotational speed sensor arranged on a conveyor element. By means of this sensor it is also possible to calculate the conveying speed signal on the basis of measured physical variables, which significantly increases the informative power of the variables calculated with the evaluation device and reduces the susceptibility to faults of said device. Likewise, a moisture sensor can additionally provide information which contributes to setting one or more of the separating devices within the scope of the analysis of the evaluation device.

The machine preferably has a plurality of image-capturing units which respectively capture at least one test image of the same conveyor element during operation. Alternatively, the machine preferably has a plurality of image-capturing units which each capture at least one test image of different conveyor elements, in particular conveyor elements which convey away from the same separating device, during operation. Alternatively, one of the two image-capturing units can be directed towards a conveying-away area, for example of a separating device which separates through an air flow. By means of the multiplicity of image-capturing units it is possible to track the composition of the harvested material, in particular a profile of the first portion along a conveying line and in particular at different parts of the conveying line downstream of a separating device of the machine. In particular, the conveying speeds of different conveyor elements can thus be set by means of different first portions. Accordingly, according to the method which is described above or below, an analysis of the conveying line areas which are acquired by the respective test images is carried out in the at least one evaluation device. While just one central evaluation device is preferably provided for the evaluation of the data of the image-capturing units, the respective image-capturing units can also be assigned separate evaluation devices. These devices can then actuate the respectively assigned separating devices, in particular in accordance with further evaluation devices. Alternatively or additionally, a central evaluation device is responsible for the production of the separating device setting signals and passes them on to a machine controller.

The image-sensing unit is preferably arranged in such a way that the test image shows at least two alternative conveying paths of the entire conveying line for different components of the harvested material, in particular for root crop and for extraneous materials. As a result, two conveyor elements can be monitored using one image-capturing unit, wherein in each case one test image part of the test image represents a section of the different conveyor elements or of the harvested material thereon. In particular, one of the conveyor elements is designed to convey extracted extraneous materials and a further conveyor element of the conveyor elements is designed to convey cleaned root crop. As a result, a particularly comprehensive picture of the cleaning performance and thus of the utilization factor of the conveyor element and/or of the separating device comprising the conveyor element can be obtained.

The image-capturing unit is preferably arranged in such a way that, during operation, the test image respectively at least partially represents at least two conveyor element sections which are separated by a separating device, in particular a separating element of a separating device. The conveyor element sections are separated only by the separating element of the separating device in the representation by the test image and are each included in the conveyor element. The separating element is closer to the image-capturing unit than the conveyor element and as a result in the test image the latter is covered by the separating element. Through this positioning of the image-capturing unit it is made possible to calculate in each case at least one first portion for two individual test image parts, and therefore to assess the effectiveness of the separating element and of the associated separating device directly. In particular, for this purpose the composition of harvested material before it reaches the separating element is compared with the composition of at least one portion of the harvested material after it passes the separating element.

The conveyor element is preferably embodied as a screening belt or hedgehog web which, during operation, runs in particular under at least one deflection roller which extends transversely over the conveyor element and deflects harvested material therefrom in a lateral direction. Alternatively, the conveyor element is embodied as a screening star or conveyor roller, wherein the conveyor roller is in particular included in a roller table.

As an alternative to or in addition to the above, the machine is embodied as a machine for separating root crop from further harvested material. In this context, in accordance with an advantageous development, the machine is operated in particular in a stationary fashion, that is to say without continuous local advancing of the machine during operation.

In accordance with another advantageous development, the machine is a potato harvester or a beet lifter.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Identically or similarly acting parts are, where expedient, provided with identical reference symbols. Individual technical features of the exemplary embodiments described below can also be combined with the features of the exemplary embodiments described above to form developments according to the invention, but always at least in combination with the features of one of the independent claims. The subject matters specified in the list of the figures are in some cases only illustrated partially in individual figures.

Figure 6:
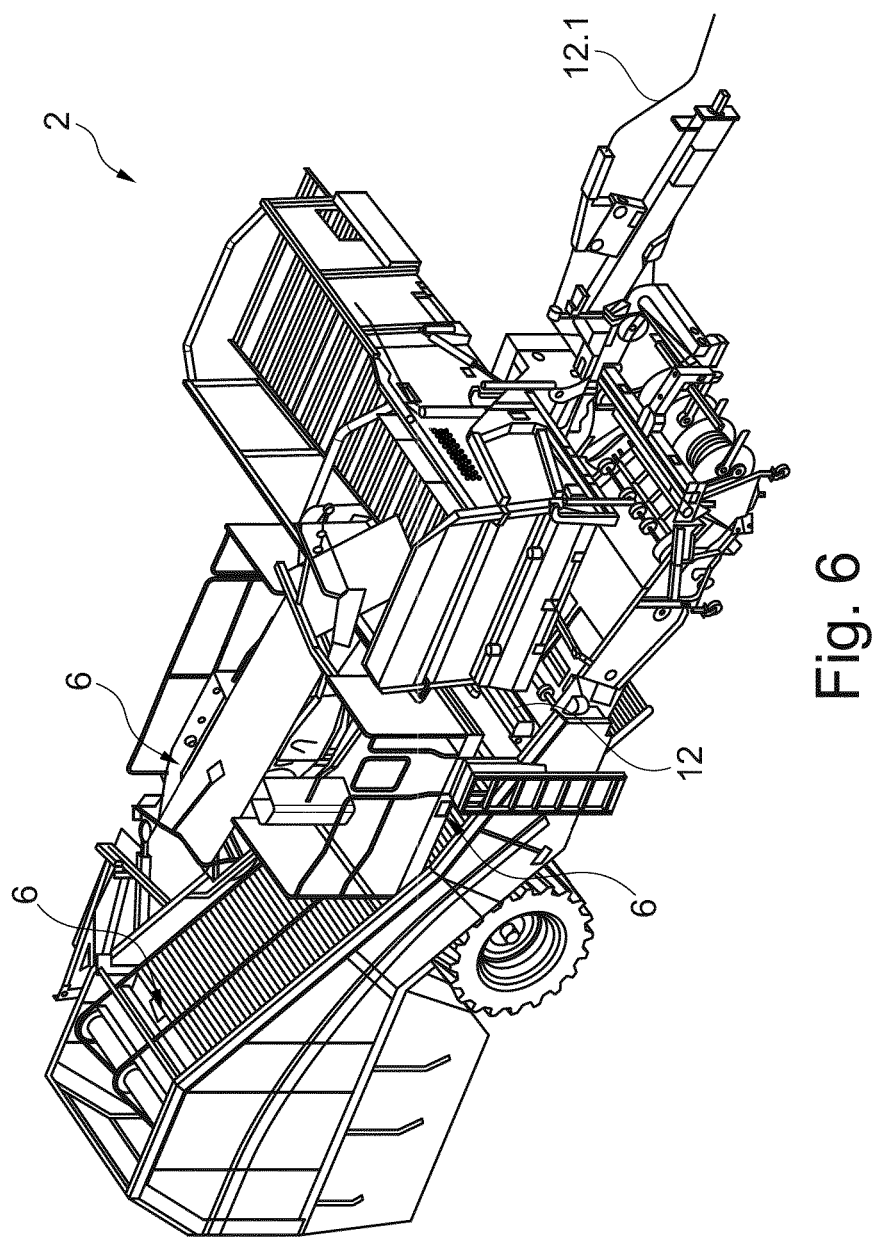
FIG. 6 shows a subject matter according to the invention.
Figure 7:
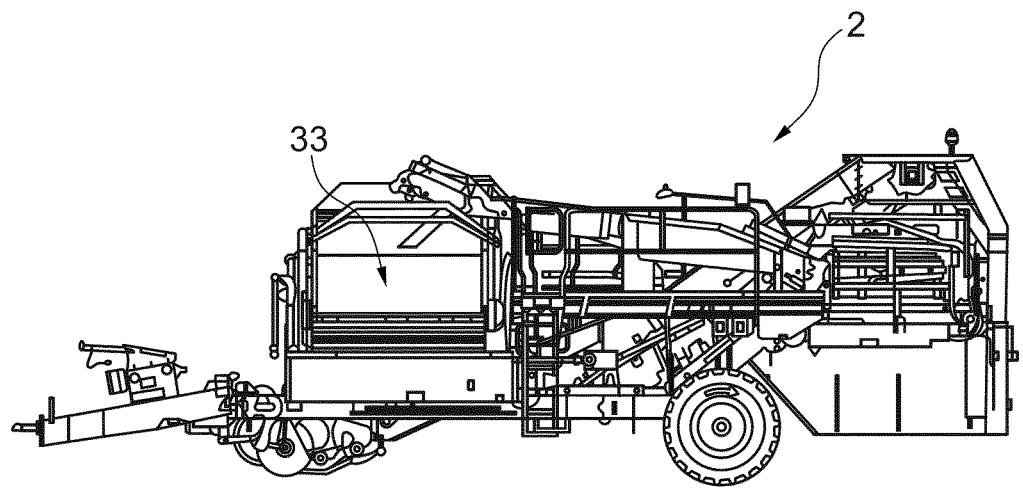
FIGS. 7 & 8 show the subject matter according to FIG. 6 in different side views.
Figure 8:
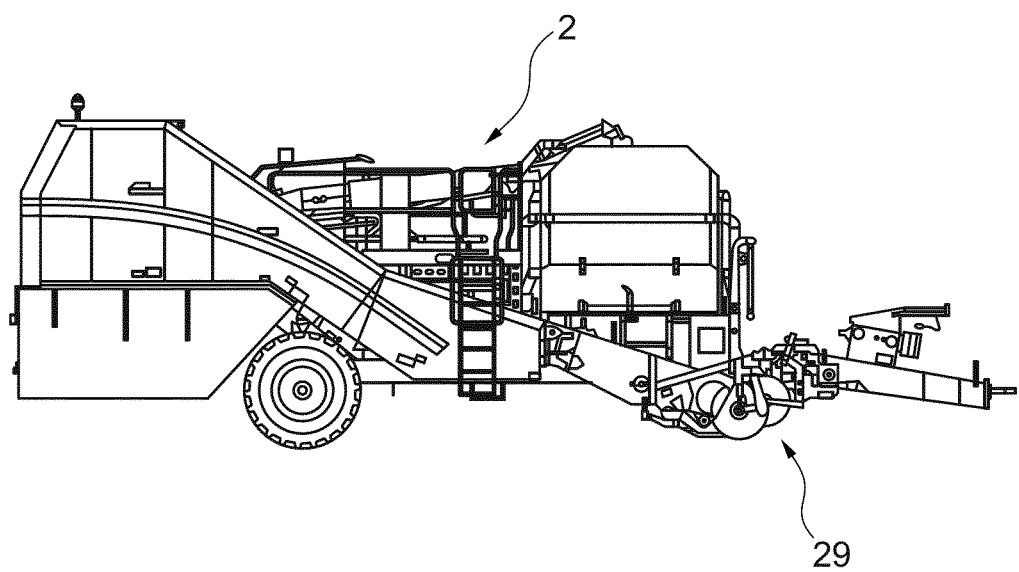

The method according to the invention serves to control the operation of a machine 2 for harvesting root crop 4 (cf. FIGS. 6 to 8). In the method, at least one optical image-capturing unit 6 captures at least one test image 8 which shows harvested material comprising root crop 4 which is moved along relative to a machine frame 12 of the machine 2 by means of at least one conveyor element which is firstly designated generally by 10.

The test image 8 is transmitted to an evaluation device which generates, on the basis of a test data set which is generated using the test image or formed thereby, a separating device setting signal for setting at least one operating parameter of a separating device of the machine (2). The representations illustrated as test images merely show schematically the parts which are relevant for the invention without any borders or limitations. Images, in particular digital images, which are captured by a camera, comprise, under certain circumstances, further information which is not illustrated in the representations. This can be masked or filtered by the camera directly when a test data set is produced or processed.

Figure 1:
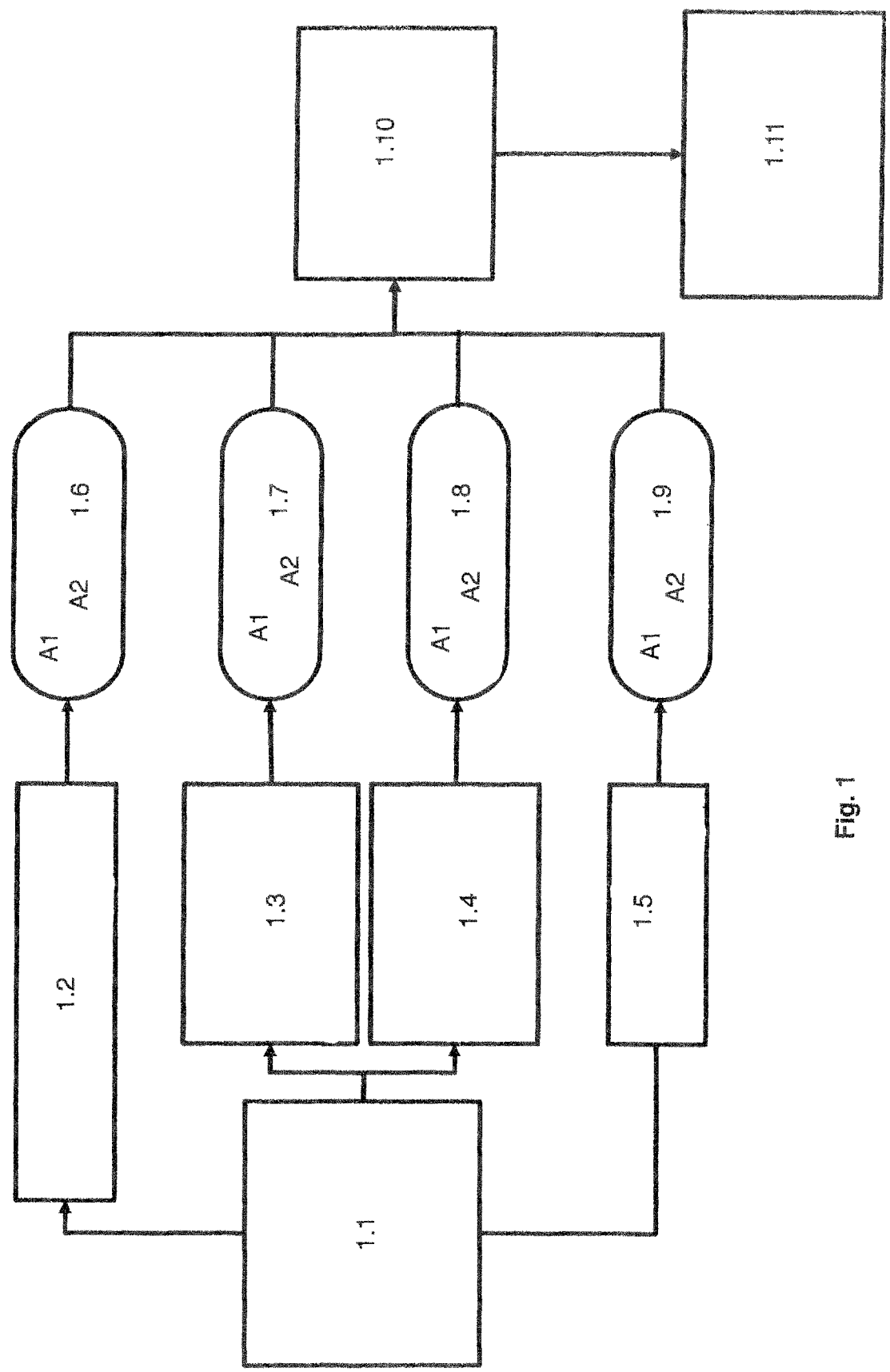
FIG. 1 shows a program flow diagram of a method according to the invention.

In one exemplary embodiment according to the invention, by means of the method which is described above, an evaluation of the composition of the harvested material is carried out on the basis of a crop flow 1.1, upstream of a first separating element (block 1.2) (FIG. 1). Moreover, the composition of the stream of harvested material is also calculated again upstream of the inlet and downstream of the outlet of a further separating device (blocks 1.3 and 1.4). The composition of the stream of harvested material is finally also calculated again in turn at the inlet of a third separating device. As a result, the following respective portions are obtained: A1 and A2 of root crop and extraneous materials (blocks 1.6, 1.7, 1.8 and 1.9). Depending on desired separating performances at the individual separating devices, the individual portions A1 and A2 of root crop or extraneous materials for respective separating devices are combined with one another in the evaluation device (block 1.10). This is followed by the setting of the operating parameters of the respective separating devices (block 1.11) in order to optimize the performance at the respective separating device.

Figure 2:
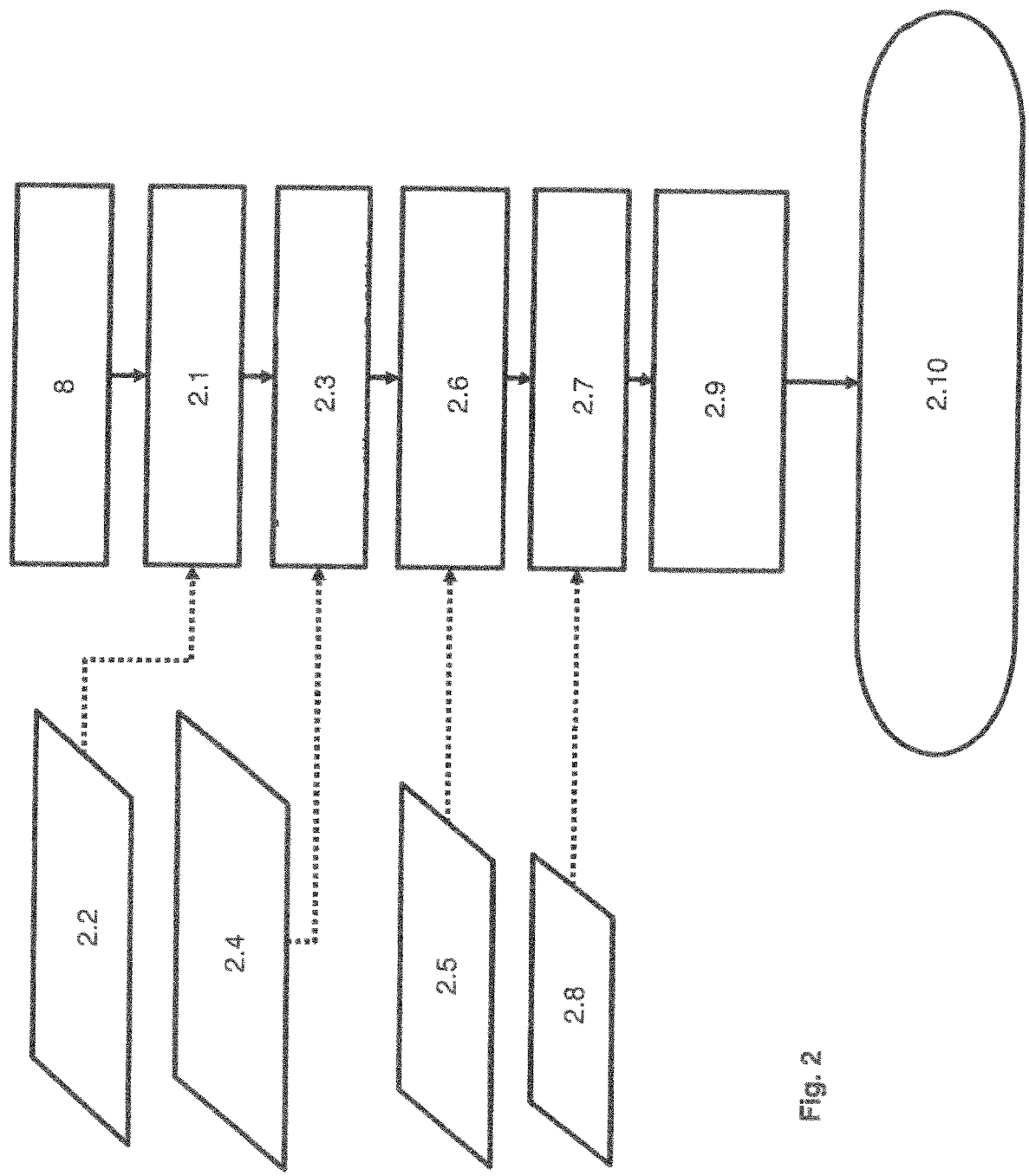
FIG. 2 shows an associated program flow diagram for determining the separating device setting signal.

The determination of the separating device setting signal is illustrated in FIG. 2 with a higher level of detail. For the purpose of providing the test data set, the relevant test image parts are firstly extracted starting from a test image 8 (block 2.1). For this purpose, a mask or region of interest (ROI) can be predefined on the basis of the position of the image-capturing unit (block 2.2) and used to differentiate distances in the test image which are to be taken into account and ones which are not to be taken into account. The calculation of portions of the individual image areas showing components of the individual components of the harvested material is now performed on the basis of the relevant image section of the test image and of the test data set which is now provided for processing (block 2.3). For this purpose, in particular the color information can be evaluated. These values can be obtained from a reference table or else specified by an operator (block 2.4).

The deviations of the calculated portions from the threshold value are calculated (block 2.6) on the basis of a threshold value definition (block 2.5). The threshold value is for example an ideal value for the respectively considered portion (e.g. root crop, extraneous material 1, extraneous material 2). Subsequently, low-pass filtering is carried out for the purpose of smoothing the acquired deviations (block 2.7). In this context, a filter time constant which is defined according to block 2.8 is used. Subsequently, a cleaning characteristic value RS is calculated (block 2.9) on the basis of the smoothed values of the deviations for the individual positions along the conveying line and the respective portions. In this context, for the sake of simplification, controller parameters can be used after which, for example, a cleaning characteristic value RS_1 (A1) is set to 1 at a first monitored conveying line for a portion A1 in the form of root crop if the deviation is too large and therefore excessively large amounts of extraneous materials are present in the considered (part of) the test image. The cleaning characteristic value RS for a portion A1 can be set to zero if there are sufficiently small deviations from an ideal value. For example the separating device setting signal can be generated by means of a three-point controller (block 2.10) on the basis of the cleaning characteristic value RS_1 (A1) of the block 2.9.

In this way, for example the ratios between the products present in a crop flow upstream of a separating device and then downstream of a separating device, for example on a conveying-away conveyor element for products, i.e. root crop (4), and a conveying-away conveyor element for extraneous materials (5), are evaluated separately by means of the method according to the invention. In the event of a single camera monitoring both conveyor elements, separate regions of interest for the conveyor element which conveys away extraneous materials and for the conveyor element which conveys away root crop are defined for this. Depending on whether there are too many potatoes (root crop 4) on the conveyor element which conveys away extraneous materials or too many extraneous materials on the conveyor element which conveys away products, parameters of the separating device which influence the separating threshold are correspondingly adapted. It is therefore possible, in particular, to position the fingers of a finger web or brushes of a brush web higher or lower and/or the finger web or brush web can run more slowly or more quickly.

Figure 3:
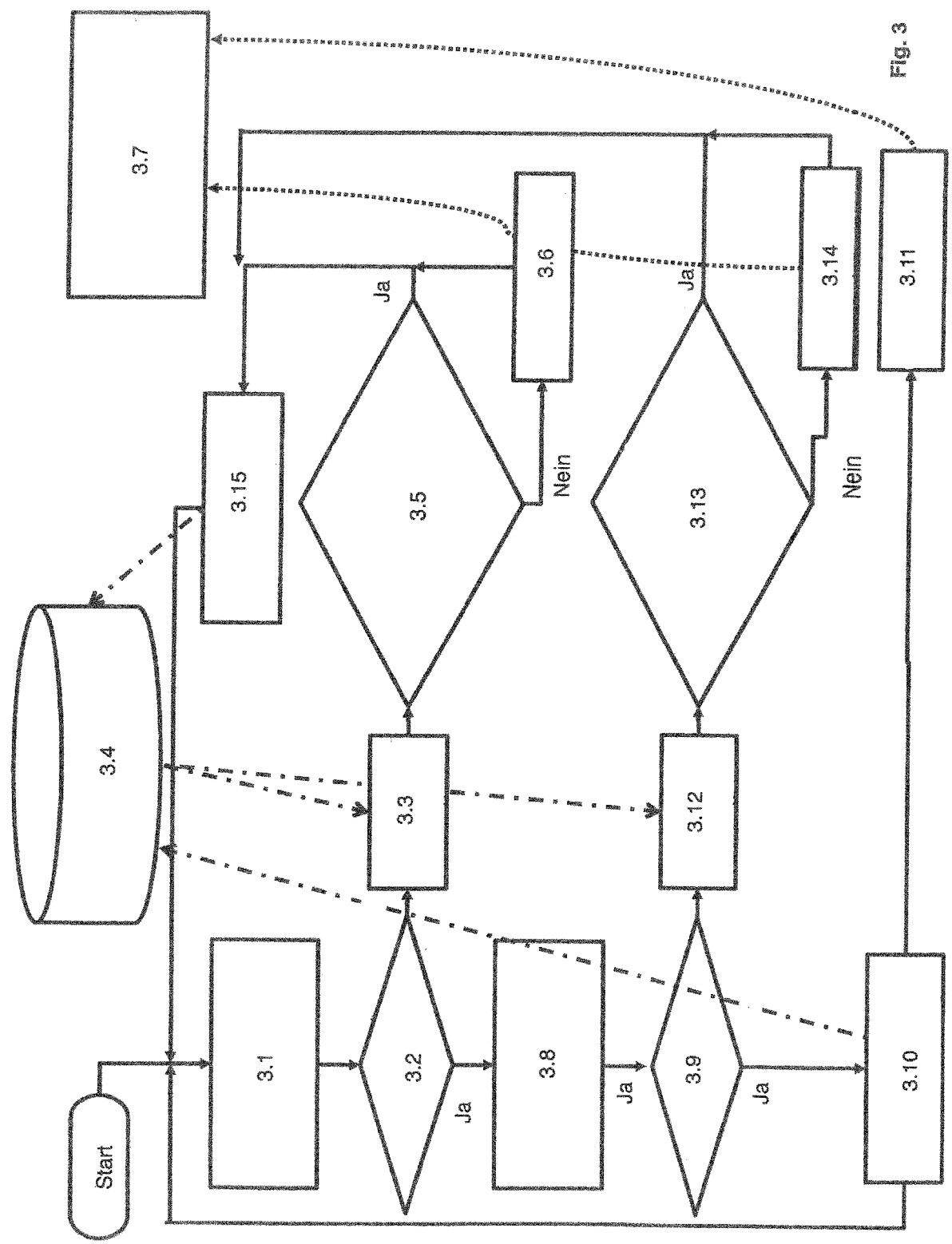
FIG. 3 shows an associated program flow diagram with processing of the cleaning characteristic values.

In one exemplary implementation of the three-point control system according to FIG. 3, attention is firstly focused on cleaning characteristic values RS_1 (A2)-RS_n (A2), i.e. cleaning characteristic values for the portions A2 which describe extraneous materials (block 3.1). For example, the concern here is with considering the portions of extraneous materials in the harvested material in the form of stones upstream and downstream of a separating device and upstream and downstream of a conveying line comprising a plurality of separating devices. The cleaning characteristic values are "zero" or "one" according to the nomenclature above. Subsequently, in block 3.2 it is checked whether the sum of the cleaning characteristic values RS_i (A2) (where i=1 . . . m) is equal to zero. If this is negated, in block 3.3 the memory 3.4 is firstly interrogated for the last cleaning characteristic values and if appropriate associated harvested material compositions at the respective positions. As far as checking in block 3.5 reveals that a change in separating device settings has occurred sufficiently long ago, in block 3.6 a degressive operating parameter signal is generated for the respective separating device. In this context, the interrogated cleaning characteristic values from the memory can also be taken into account. The separating device or devices (block 3.7) is/are given a less forceful setting so that fewer portions of root crop remain in the flow of extraneous materials or in the flow of harvested material on the conveying line. The last cleaning characteristic value or values RS_i (A2) is/are input into the memory 3.4, if appropriate with respectively associated portions A2 (block 3.15).

In the event of the sum of the cleaning characteristic values RS_i (A2) (where i=1 . . . m) being equal to zero, subsequently in block 3.8 the focus is on cleaning characteristic values RS_i (A1) relating to the portions A1, e.g. root crop, and these are correspondingly interrogated. It is subsequently checked whether the sum of these correction values yields zero again (block 3.9). If this is the case, the last cleaning characteristic values RS_i (A1) are also input again into the memory 3.4 (block 3.10). A change in the operating parameters is not necessary and a neutral operating parameter signal or no operating parameter signal is output (block 3.11). If the sum of the correction values for the portions A1 is unequal to zero, the old values from the memory are interrogated again at 3.12, and in block 3.13 it is checked whether sufficient time has already passed since the change in the last operating parameters. If this is the case, at 3.14 an operating parameter is output for a more forceful setting of the separating devices.

Figure 4:
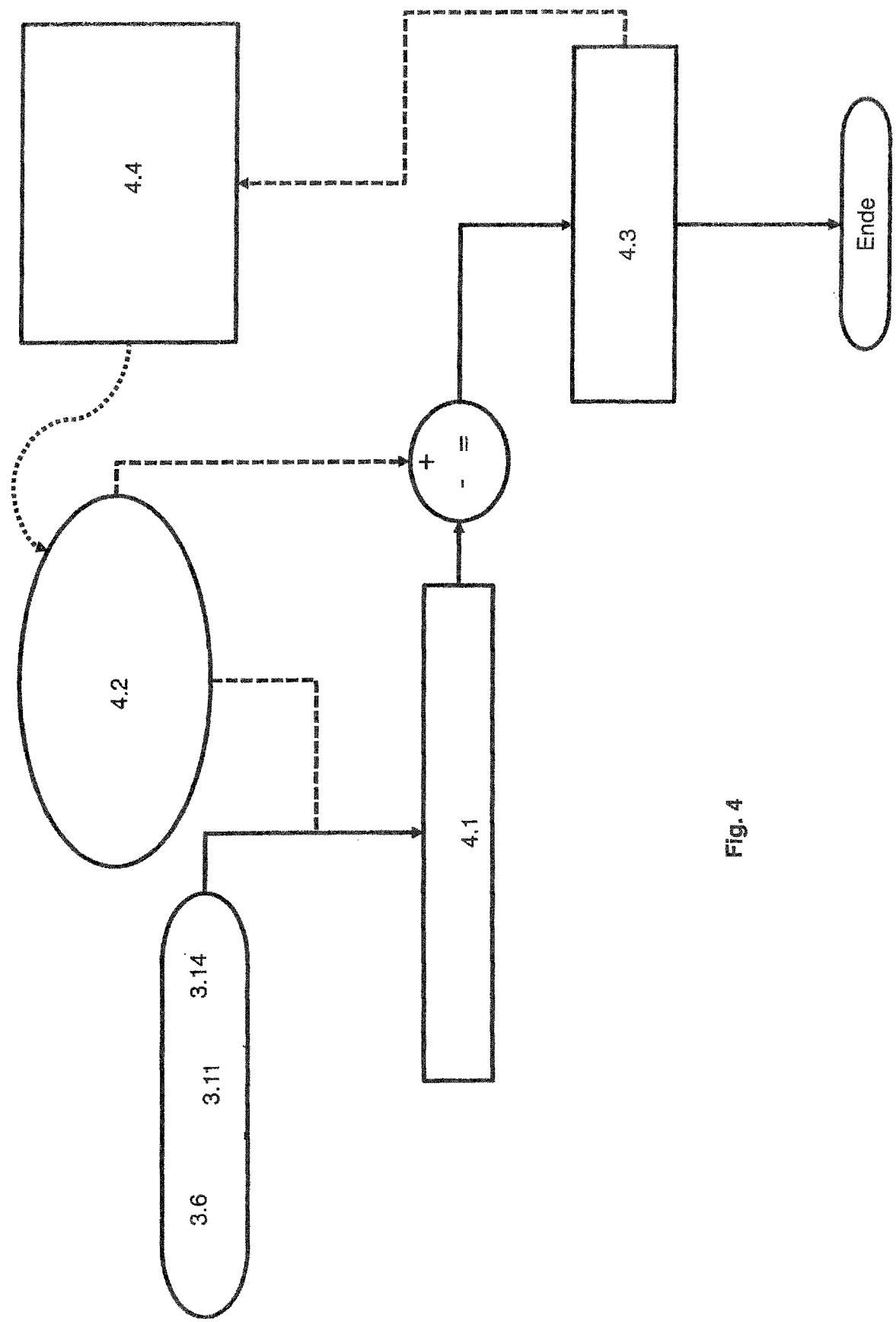
FIG. 4 shows an associated program flow diagram for setting the separating device.

For the specifications according to FIG. 3 to be implemented in the block 3.7 it is necessary for separating device actuators to be driven. For this purpose, according to FIG. 4, separating-device-specific changes in the operating parameters are acquired in the controller 4.1 on the basis of the specifications of the blocks 3.6, 3.11 and 3.14, taking into account the current settings (4.2) of the respective separating device. For this purpose, e.g. speeds of the separating device elements, rotational speeds, distances or inclinations are defined. Manipulated variables for the separating device actuators of the respective separating devices are defined on the basis of the latter in the block 4.3 and are used to set the separating devices (block 4.4).

Figure 5:
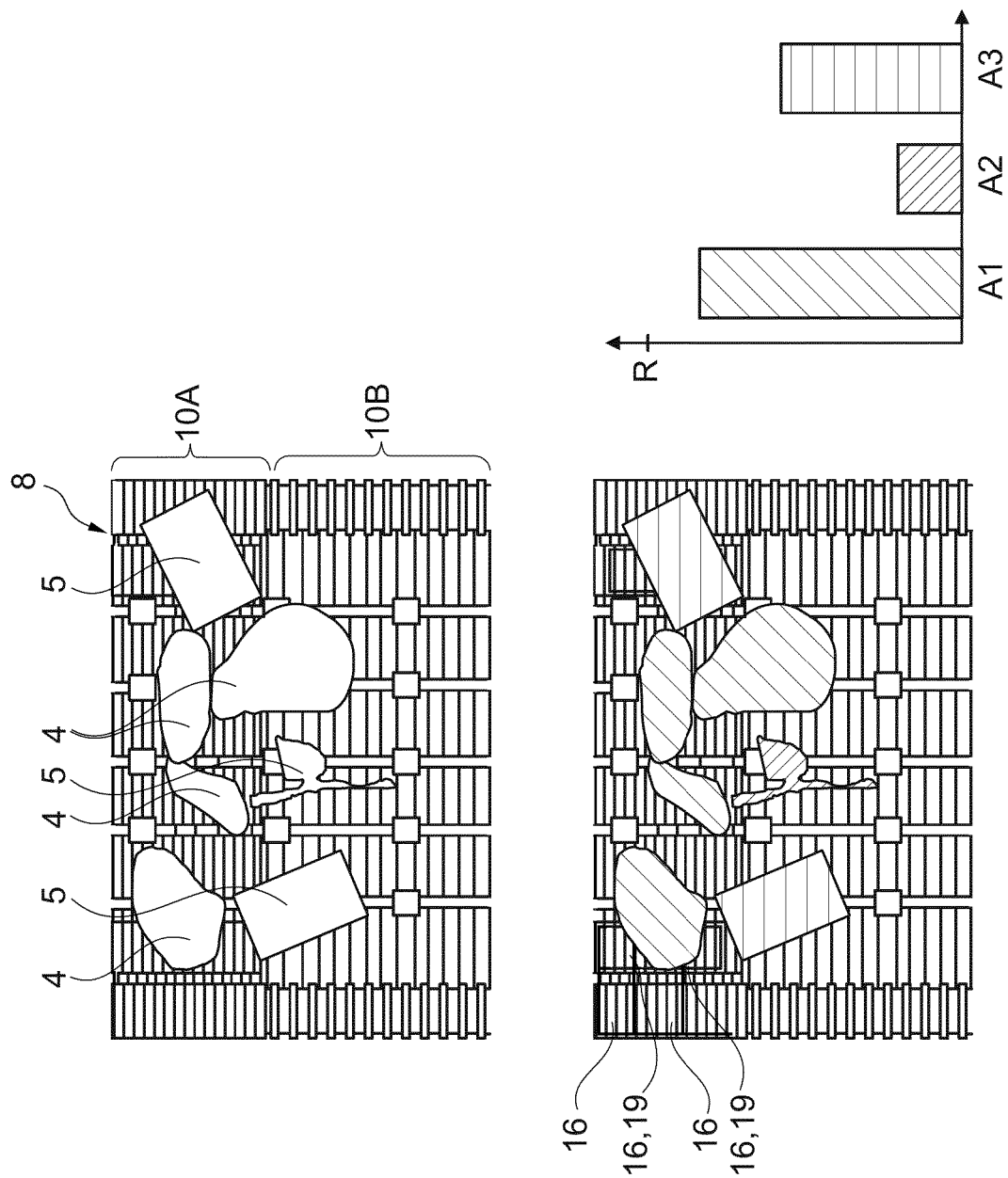
FIG. 5 shows a view of a test image and its partial evaluation.

FIG. 5 shows by way of example a test image 8 in the upper part of the figure, which image shows the transition from one conveyor element 10a to a conveyor element 10b. Root crop 4 and extraneous materials 5 which comprise stones and weeds are located in this conveying line area. According to the classifiers which are defined in the training of the algorithm or specified by means of a database, for example a table with color information, e.g. in the HSV format, individual partial image areas 16 are checked for the presence of identical components. Therefore, the assignment of the respective image areas to the individual portions, illustrated by way of example at the bottom left in FIG. 5, results in a portion distribution of individual portions of root crop 4 and extraneous materials 5 in the test image 8. A1 therefore shows the portion of the root crop 4 in the test image or the corresponding test data set, A2 shows the portion of weeds and A3 shows the portion of stones. This assignment is preferably made on the basis of the color information of the individual pixels, i.e. an image area 19 which is assigned to a portion corresponds in particular to an area of a pixel. The cleaning characteristic value which is designated generally by RS is nevertheless preferably based, for example, on a deviation of the first portion A1 from a threshold value R which indicates an optimum portion distribution of root crop 4 on the observed site of the conveying line. For example, the cleaning characteristic value RS is set to 1 in the case of a deviation 50% from the correction value, and to 0 in the case of a deviation of <50% from the correction value. These values are then correspondingly stored and/or processed in the further program sequence according to FIGS. 1 to 4.

The machine 2 according to the invention is embodied according to FIG. 6 as a towed potato harvester, wherein a multiplicity of conveyor elements 10 and their associated separating devices are secured by means of a machine frame 12, which is only partially designated. Along the conveying line there are a plurality of image-capturing units 6 which capture images of the harvested material which is transported on the conveyor elements 10 and comprises root crop 4. The positions of the image-capturing units 6 which are indicated in FIG. 6 are a transition from a first conveyor element 10A in the form of a screening belt to a second conveyor element 10B in the form of a screening belt which is additionally surrounded by a coarse weed belt, and the transition from this second screening belt 10B to a further conveyor element 10C comprising a further separating device. Moreover, on the output side of this separating device a conveyor element 10E which leads to the sorting table and has a further image-capturing unit 6 is monitored, wherein at the same time images of a further conveyor element 10F which is provided for residues of extraneous materials 5, in particular stones, are captured.

An evaluation device can be positioned at any desired centrally accessible location, but preferably in the vicinity of the sorting table. A velocity signal or information relating to the setting of the separating devices can be sent to a towing vehicle from the evaluation device, for example via a cable 12.1 which can be seen in FIG. 6.

The machine which is illustrated in a side view in FIGS. 7 and 8 can be provided at further positions with optical image-capturing units 6. Thus, further image-capturing units can additionally be arranged directly in the region of a grubbing device 29 or a drop step leading to a bunker 33.

Figure 9:
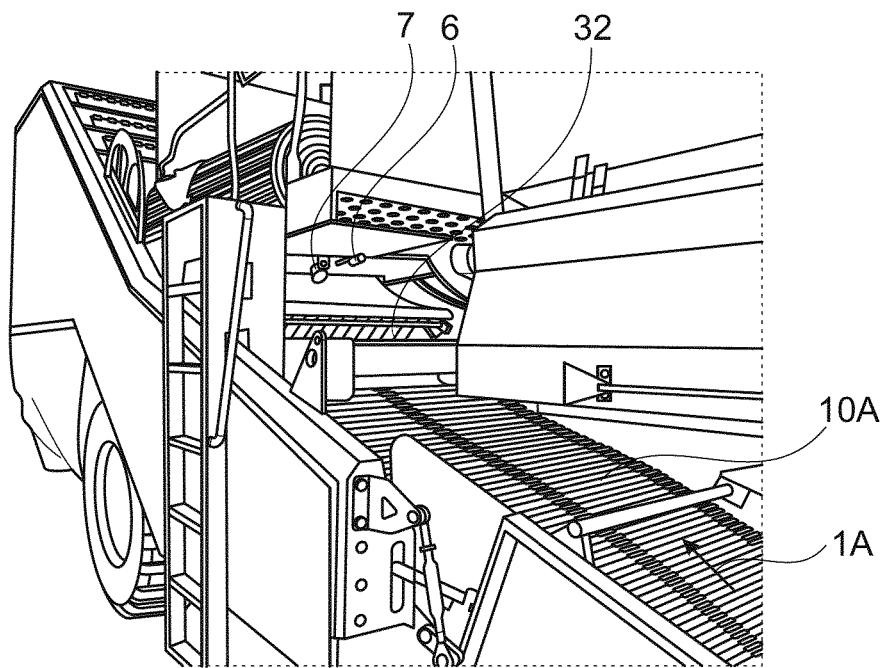
FIG. 9 shows a partial view of the subject matter according to FIG. 6 with a conveyor element.
Figure 10:
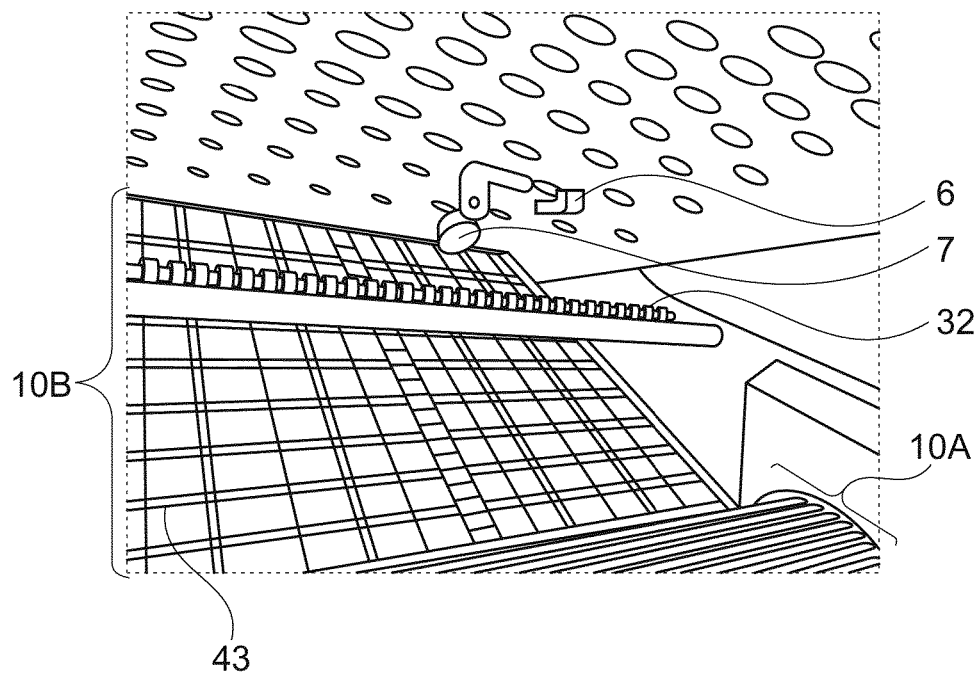
FIG. 10 shows a view of a detail of an area of the device according to FIG. 6 which is partially illustrated in FIG. 9.

FIGS. 9 and 10 show the arrangement of an optical image-capturing unit 6 which is arranged on the frame side above a first drop step between a conveyor element 10A and a conveyor element 10B and whose field of vision is directed downward. A light source 7 ensures that the field of vision is illuminated in order to capture a sufficiently lit test image 8. The conveyor element 10A is a screening belt which already screens out some of the extraneous materials 5, in particular earth and/or clods, coming from a grubbing device 29 and transfers them to a further conveyor element 10B, embodied as a screening belt, via a drop step. This conveyor element 10B additionally has a coarse weed belt which is provided for separating off the weeds present with the potatoes or in the harvested material. Stripping devices 32 are correspondingly arranged over the width of the conveyor elements 10B.

A height H of the stripping device 32 above the conveying plane of the conveyor element 10B can be adjusted by means of the separating device setting signal. This constitutes a possible way of influencing the separating performance of the separating device which is embodied as a weed belt. Moreover, a relative speed of the screening belt to the coarse weed belt 43 can be set. FIG. 10 illustrates only the coarse weed belt 43, and not the actual conveyor element 10B (cf. FIG. 14), embodied in the form of a screening belt, for purposes of clarity.

Figure 11:
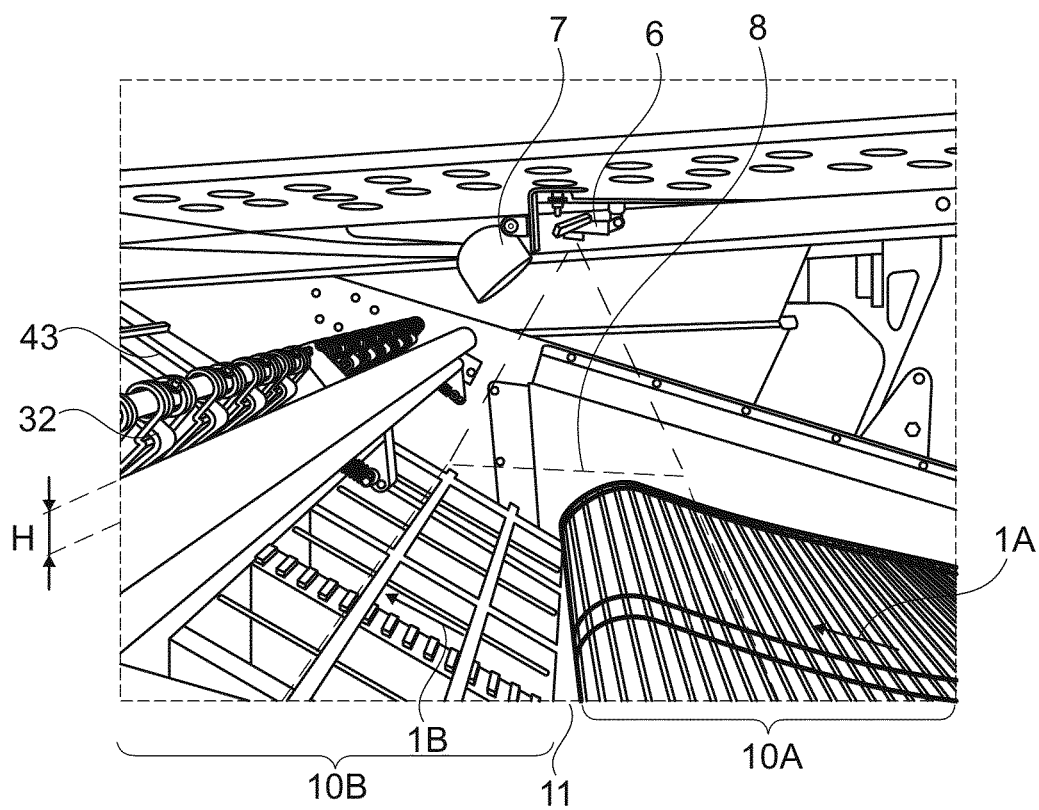
FIG. 11 shows the subject matter according to FIG. 10 from a different perspective.
Figure 12:
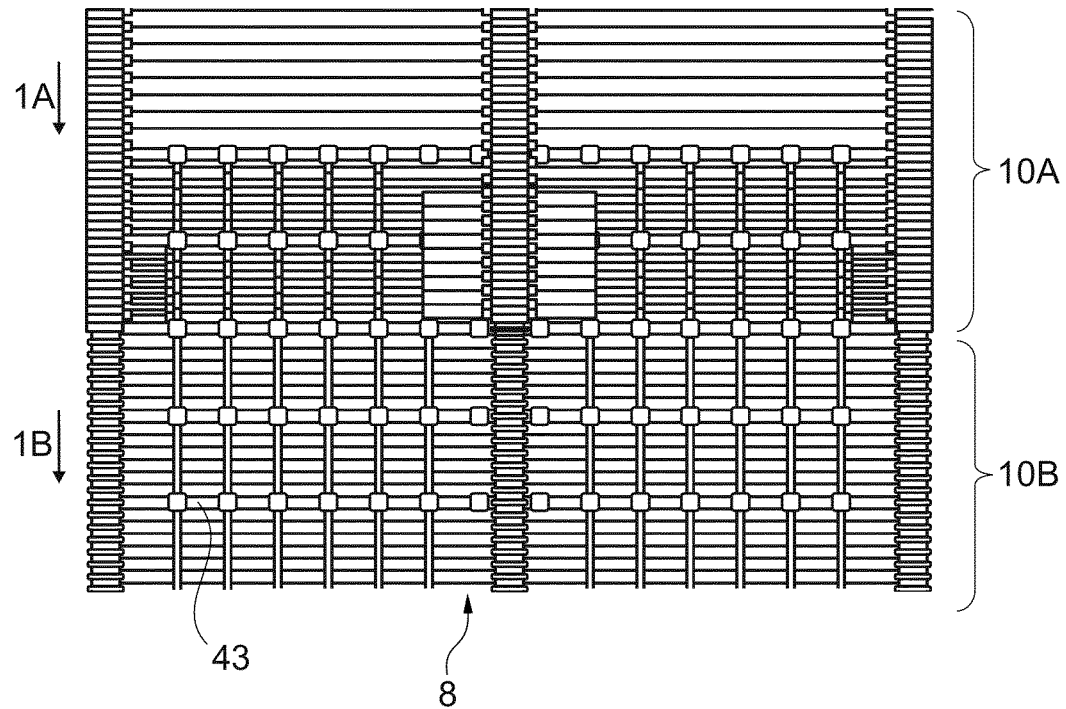
FIG. 12 shows an illustration of the test image of the image-capturing unit according to FIG. 10.

A test image 8 which is obtained from the field of vision of the optical image-capturing unit 6, which is shown by means of dashes in FIG. 11, is illustrated in detail in FIG. 12. The evaluations described above are made on the basis of the deviations of the portions of the captured and classified objects from the threshold values R, using a test data set produced from this test image 8 or formed thereby.

The harvested material which is still present is transferred from the conveyor element 10B to a further conveyor element 10C with a conveying direction 1C. A separating device in the form of a plurality of rotating deflection rollers 24 which are positioned one above the other is assigned to said further conveyor element 10C. The harvested material is transported in the direction of the conveyor element 10D by means of a pulse which is applied by said separating device (FIG. 13).

A distance H between the conveyor element 10C and the lower deflection roller 24 can be set for the purpose of varying a separating performance and it therefore constitutes the adjustable operating parameter. Under certain circumstances, further distances between the individual deflection rollers 24 can be varied in respect of the distance from one another for the purpose of intensity of the deflection or any separating function in which weeds are drawn in between the deflection rollers 24. Alternatively or additionally, a variation in the separating performance or deflection arises from the adjustability of the circulating speeds of the deflection rollers 24.

Likewise, a height of each of the lower ends of fingers 26 of a separation device which is embodied as a finger web 26.1, which is associated with the conveyor element 10D, can be set as one of a plurality of operating parameters. The height H describes the distance between the fingers 26 and the upper edge of the conveyor element which is embodied as a hedgehog web. Moreover, an attitude angle of the finger web 26.1 is configured in such a way that it can be set with respect to a vertical to the conveying plane of the conveyor element. The same applies to the circulating speed of the finger web 26.1.

Figure 13:
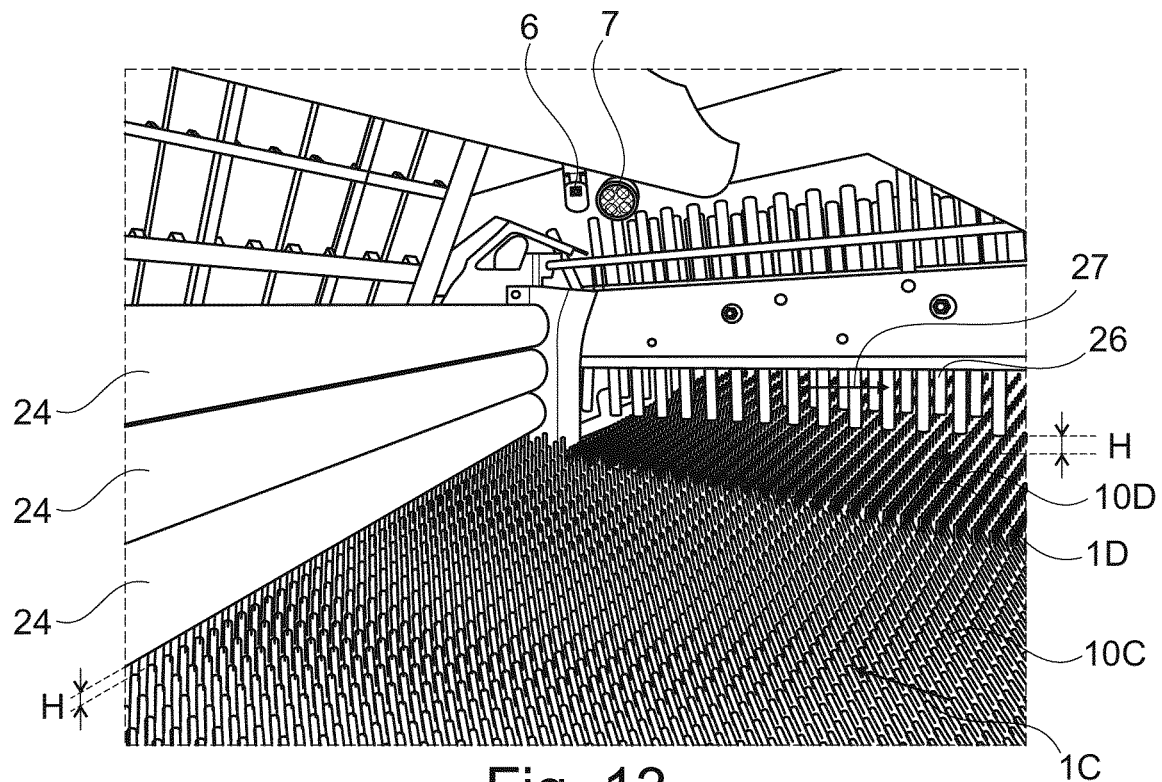
FIG. 13 shows a separating device of the machine according to FIG. 6 with an image-capturing unit.
Figure 14:
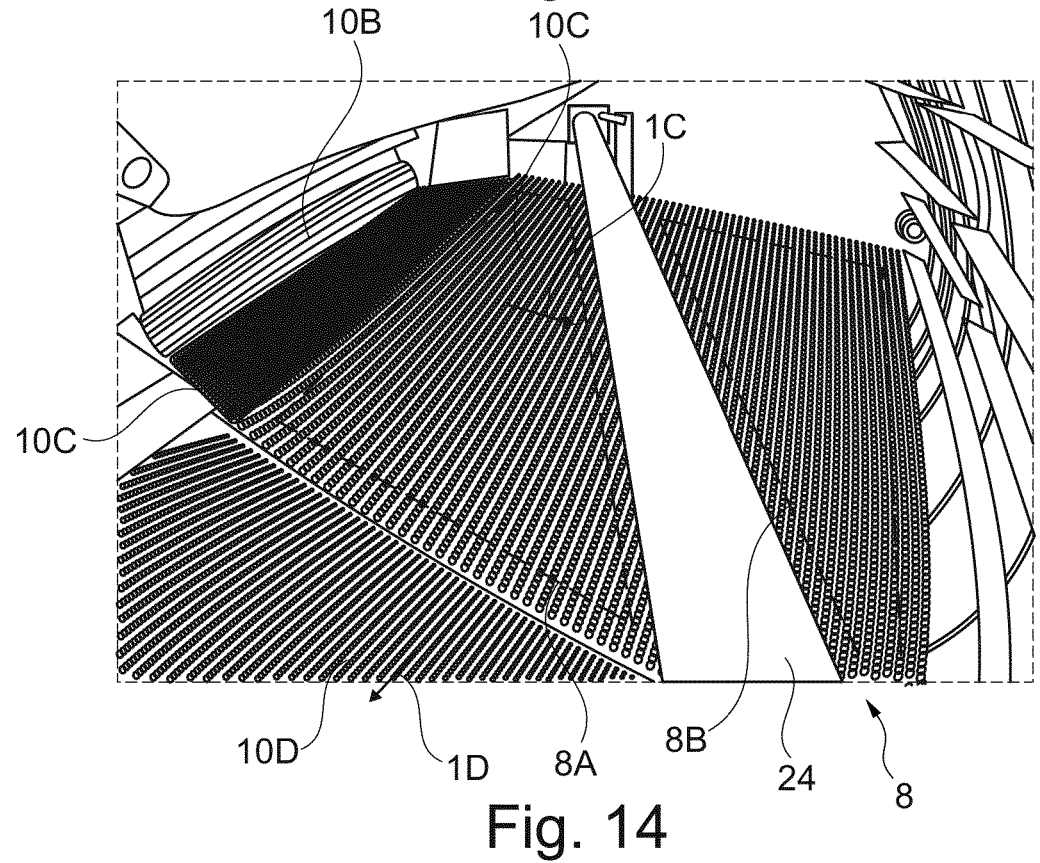
FIG. 14 shows a schematic test image captured from the perspective of the image-capturing unit shown in FIG. 13.

The image-capturing unit 6 illustrated in FIG. 13 generates the test image 8 which is illustrated in FIG. 14 and in which a test image 8A which is relevant in the present exemplary embodiment is defined by means of filtering or masking. A test image part 8B which is located behind the deflection rollers 24 when viewed from a conveying direction 1C can additionally be selected in order to monitor a separating device performance, in this case a separating performance of the deflection rollers 24. In particular, the area upstream of the deflection rollers 24 is monitored for the setting of the separating device. The test data set is obtained from the corresponding test image part 8A.

Insofar as an associated cleaning characteristic value RS for the test image part 8A produces an excessively low separating performance of a separating device which is arranged upstream or illustrated, the separating device can be given a more forceful setting. Alternatively, if the cleaning characteristic value in the test image part 8B indicates an excessively large separating performance, for example owing to excessively large portions of extraneous materials 5 in the form of clods behind the deflection rollers 24, which are still required at least partially to prevent damaging handling of the potatoes on the following conveying line, a distance H between the deflection rollers 24 and the conveyor element 10 can be reduced, and the separating device can therefore be given a less forceful setting.

Figure 15:
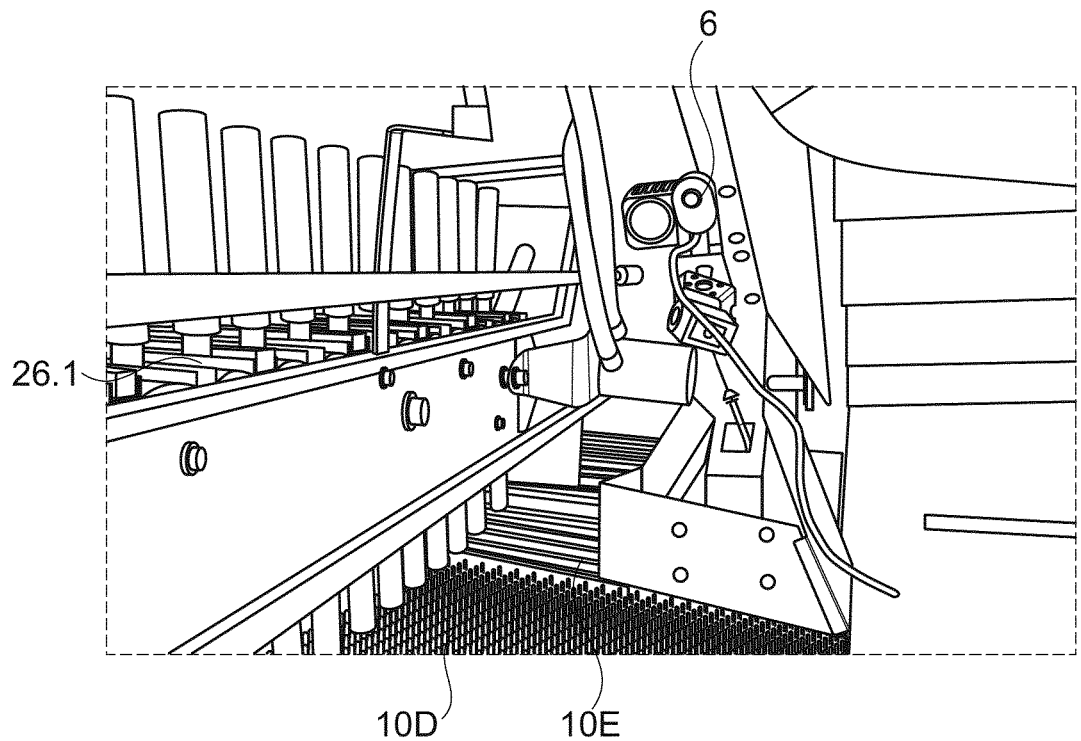
FIG. 15 shows a further separating device of the machine according to FIG. 6 with an image-capturing unit.
Figure 16:
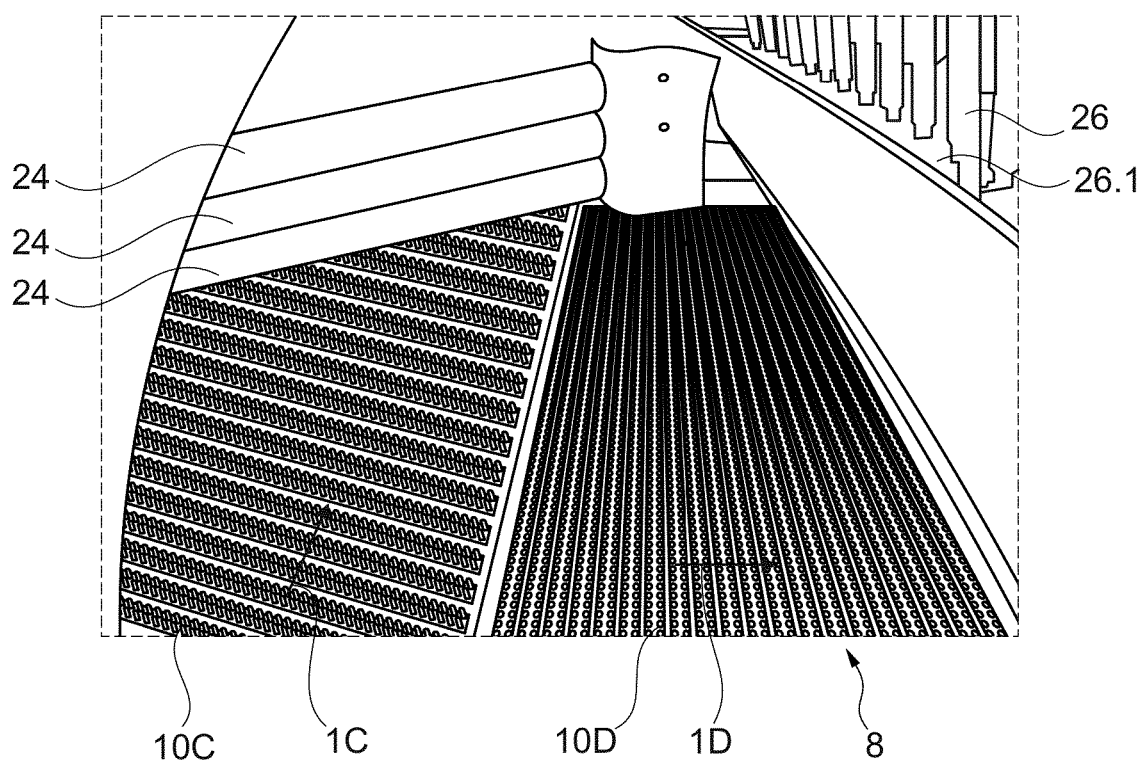
FIG. 16 shows a schematically illustrated test image captured from the perspective of the image-capturing unit shown in FIG. 15.

A further optical image-capturing unit 6, which is arranged in the vicinity of the conveyor belts 10C and 10D is illustrated in FIG. 15 and FIG. 16. This image-capturing unit 6 can be used in addition to or as an alternative to the image-capturing unit 6 according to FIG. 6. In particular, said image-capturing unit 6 serves to monitor the effect of the separating and deflection device embodied by the deflection rollers 24. A light source 7 for better illumination of the monitored area is also assigned to this monitoring unit.

Figure 17:
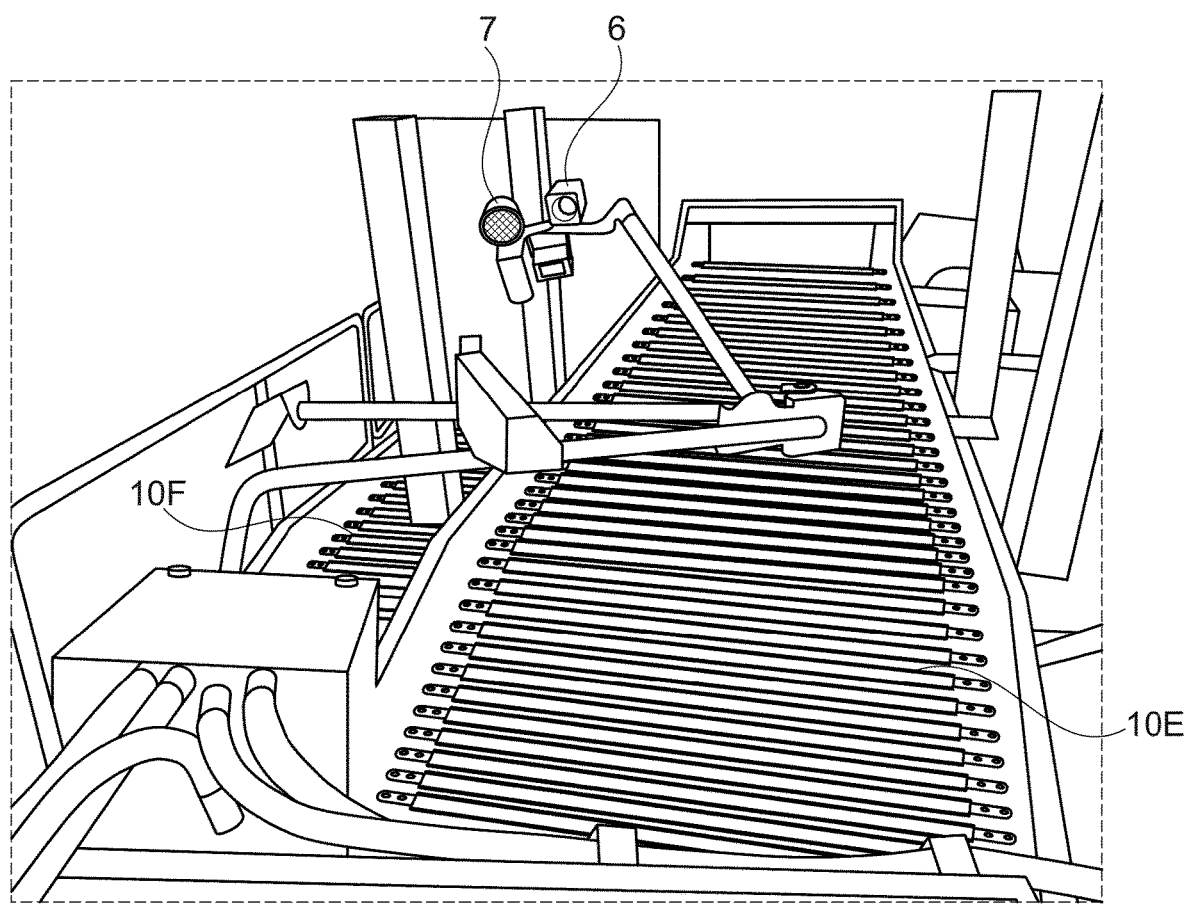
FIG. 17 shows a further view of a detail of a machine according to FIG. 6 with a further image-capturing unit.
Figure 18:
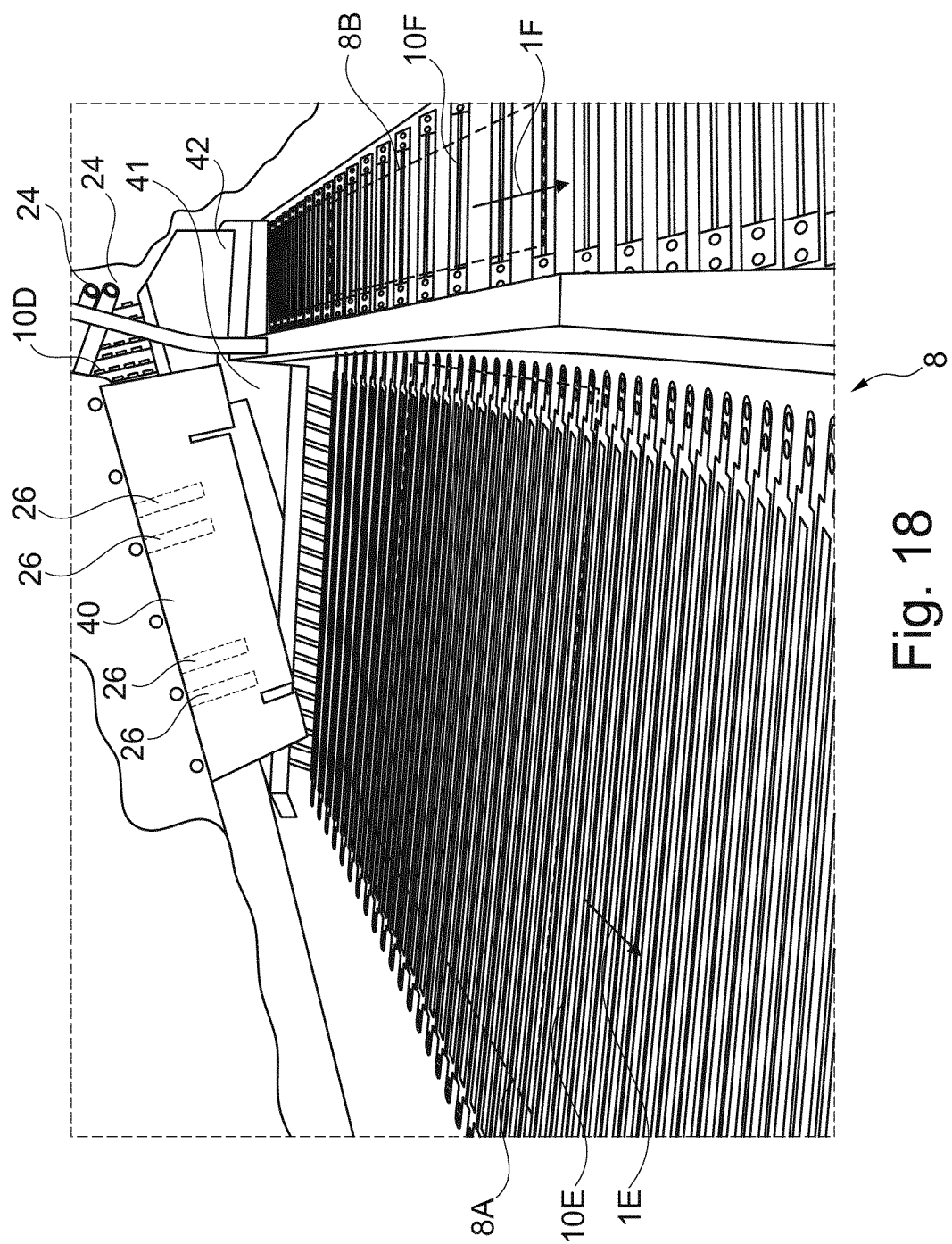
FIG. 18 shows a schematic illustration of a test image considered from the perspective of the image-capturing unit according to FIG. 17.

A further optical image-capturing unit 6 is arranged with an associated light source 7 above a sorting table with a view of a conveyor element 10E and a conveyor element 10F (FIG. 17). By means of masking, the test image parts 8A and 8B which are represented in the test image 8 according to FIG. 18 are selected, and, on the one hand, monitor the conveyor element 10E, as a conveyor path, with a conveying direction 1E for transporting away root crop 4 and, on the other hand, monitor the conveyor element 10F, as a further conveyor path, with a conveying direction 1F for transporting away extraneous materials 5 in the form of stones and/or clods. By means of the evaluation described above it is checked whether the portions of root crop 4 on the conveyor element 10F are too large. If this is the case, by means of the method according to the invention the separating device located upstream is given a sharper setting. This separating device is located above the conveyor element 10D which is embodied as a hedgehog web, and said separating device is provided, in particular as a finger web, with fingers 26 which are illustrated by way of example and by means of dashes, even though in the representation shown they are arranged behind the cover 40 located in front of them. For example, the distance between the fingers 26 and the conveyor element 10D is reduced in order to convey away a greater amount of harvested material, in the form of root crop 4, onto the conveyor element 10E via an associated chute 41. If too many extraneous materials 5 in the form of stones and/or clods are detected on the conveyor elements 10E, for example the circulating speed of deflection rollers 24 can be reduced so that there is a smaller pulse applied to extraneous materials 5, thus bringing about better deflection of any stones in the direction of the conveyor element 10F. Extraneous materials 5 then slide onto the conveyor element 10F in an improved way via a chute 42.

Figure 19:
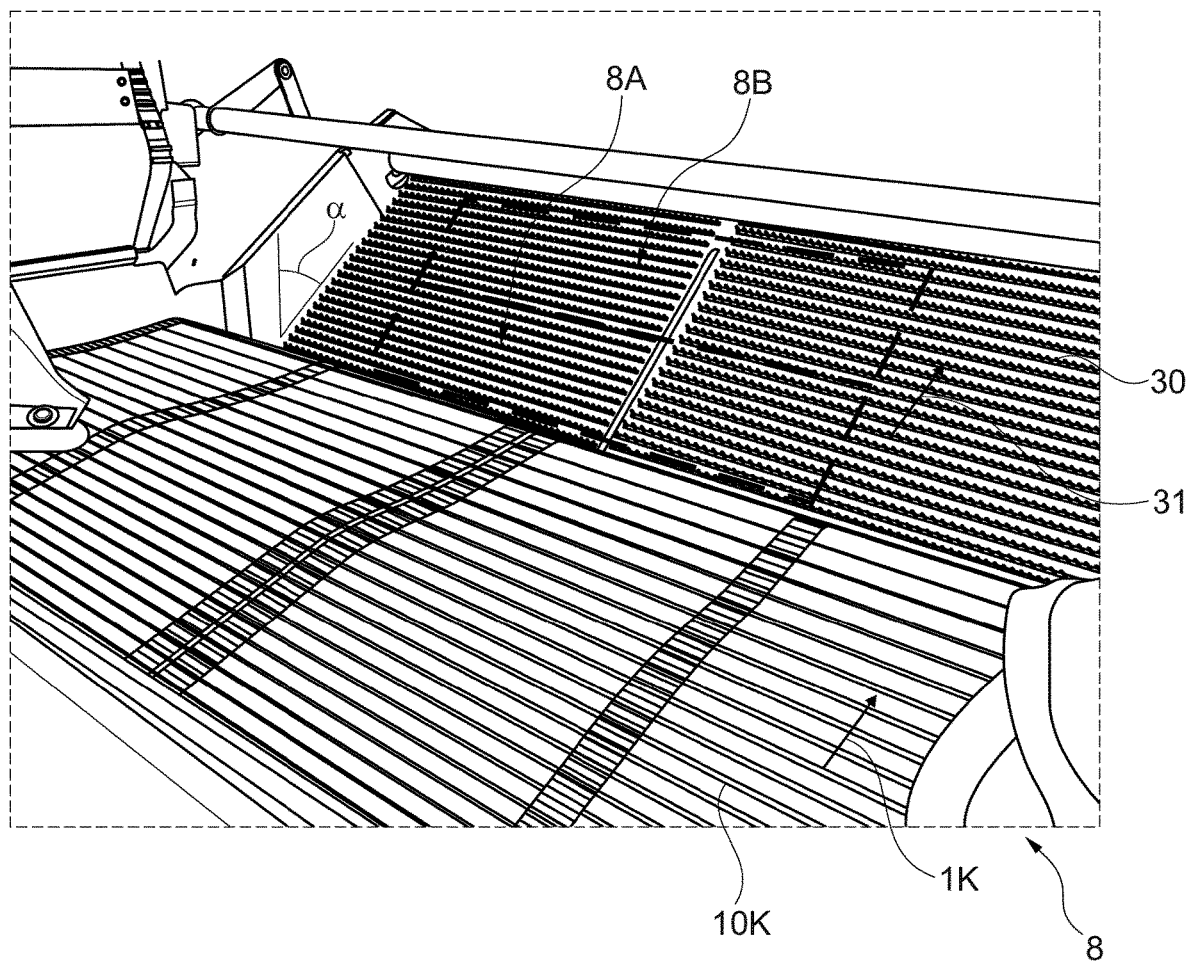
FIG. 19 shows a view of a detail of a further device according to the invention.

FIG. 19 illustrates the application of the method according to the invention in a further separating device, in the form of a fine weed elevator here. Correspondingly, the test image 8 illustrated in FIG. 19 shows an inward-conveying conveyor element 10K with a conveying direction 1K which leads via a drop step to a separating device which is embodied as a fine weed elevator and has a weed belt 30. The latter transports any fine weeds present in the stream of harvested material onward in the direction 31, while potatoes and relatively heavy extraneous materials which are in the stream of harvested material and which land on the weed belt 30 drop back into the gap between the conveyor element 10K and the fine weed elevator owing to the oblique position of the weed belt 30 which can be specified by means of an adjustable angle α. Insofar as the portions of root crop 4 and extraneous materials 5 are outside the reference values in test image parts 8A and 8B, the separating device can be given a more forceful or correspondingly less forceful setting, for example by adjusting the attitude angle α or by means of a change in the circulation speed of the weed belt 30, in order in this way to arrive at the desired separating performance.

Figure 20:
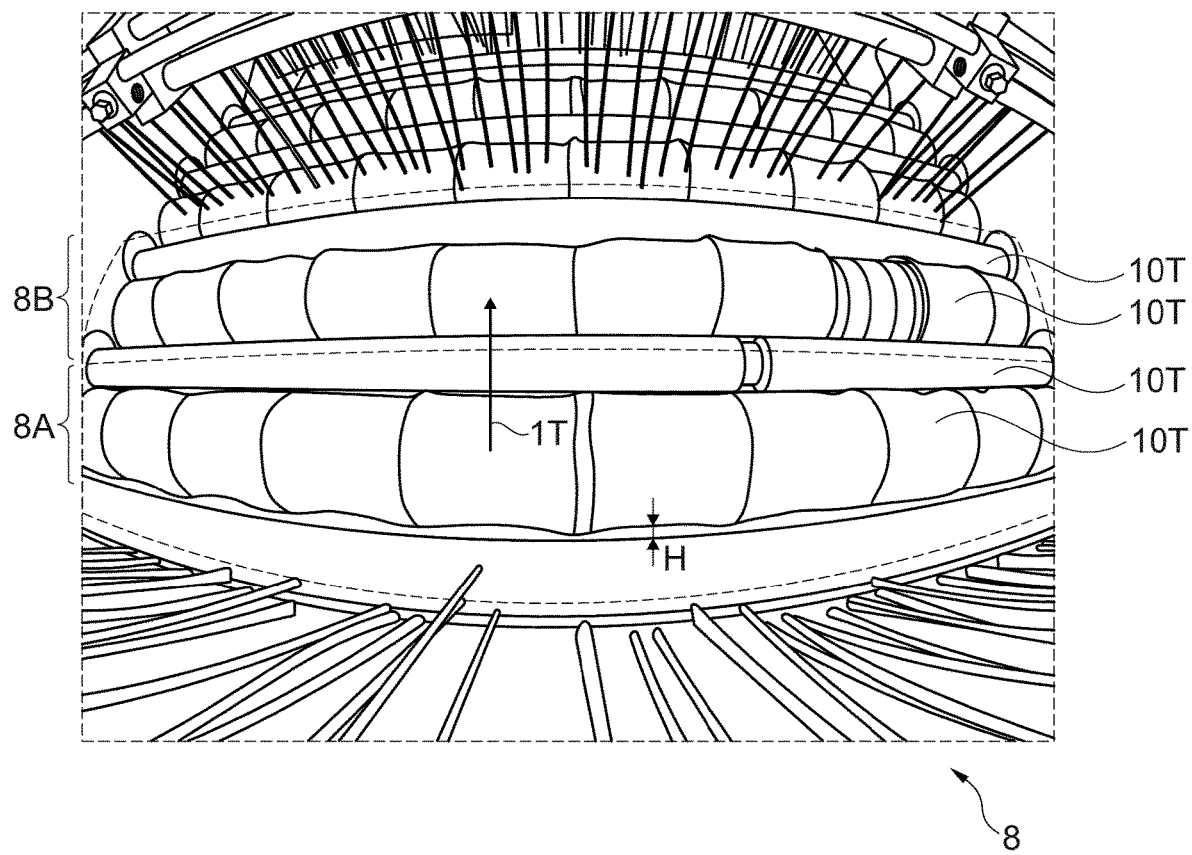
FIG. 20 shows a further view of a detail of a further device according to the invention.

In the case of the roller soil remover according to FIG. 20, preferably used in the field of bearing technology, the distance H between individual conveyor elements 10T is made adjustable. The conveyor element 10T therefore also directly forms the separating device. In the individual test image parts 8A and 8B of the test image 8, the portion of extraneous material is preferably calculated and used for the adjustment of the separating device performance. In this context, as described above, a perspective correction is carried out owing to the "fish-eye" representation of the image-capturing unit 6.

Further alternative exemplary embodiments of the invention can be embodied e.g. as self-propelled beet lifters or as a cleaning line in the potato or beet bearing technology.

The invention claimed is:

1. A method for controlling the operation of a machine for at least one of harvesting root crop and separating root crop from the rest of the harvested material comprising extraneous materials, the method comprising the steps of:
   capturing, with a first optical image-capturing unit, a first test image of at least one part of the harvested material which is moved along relative to a machine frame by means of a first conveyor element leaving a separating device of the machine, wherein the first optical image-capturing unit is fixed on the machine above the first conveyor element and is directed at the first conveyor element and a stream of harvested material which is located between the first optical image-capturing units and the first conveyor element during operation of the machine;
   generating test data using the first test image or by the first test image by at least one of the first optical image-capturing unit and an evaluation device;
   capturing, with a second optical image-capturing unit, a second test image of at least a second part of the harvested material which is moved away from the separating device relative to the machine frame by means of a second conveyor element;
   generating second test data using the second test image or by the second test image by at least one of the second optical image-capturing unit and the evaluation device; and
   automatically generating, on the basis of the first test image and the second test image, a separating device setting signal for automatically setting at least one operating parameter of the separating device of the machine, wherein the operating parameter defines how forcefully the machine separates root crops from the extraneous materials, and
   wherein the root crop leaves the separating device on the first conveyor element and the extraneous materials leave the separating device via a path that is different than the first conveyor element, and
   wherein the first test data indicates an amount of extraneous material positioned on the first conveyor element leaving the separating device.

2. The method as claimed in claim 1, wherein the evaluation device evaluates the first test data and the second test data set locally on the machine or on a directly connected tractor vehicle.

3. The method as claimed in claim 1, wherein the evaluation device calculates at least one first portion (A1), formed by at least one image area, of the first test image, wherein the at least one image area represents at least partially a defined component of the harvested material or of the machine, wherein in particular a cleaning characteristic value is calculated on the basis of the first portion (A1).

4. The method as claimed in claim 3, wherein the at least one image area which forms the first portion (A1) is identified as showing the defined component of the harvested material or machine.

5. The method as claimed in claim 3, wherein the first test data is classified by statistical classification method, and an image area is added to the first portion (A1).

6. The method as claimed in claim 5, wherein when exemplary image areas classified as being associated with the first portion (A1), of a reference image are input, the evaluation device automatically further develops a model on which the classification method is based and/or automatically calculates or changes the at least one reference value range.

7. The method as claimed in claim 3, wherein the at least one test value of the first test data is compared with at least one reference value (R), and an image area is added to the first portion (A1).

8. The method as claimed in claim 3, wherein different image areas are weighted differently during the calculation of the first portion (A1).

9. The method as claimed in claim 3, wherein the entire first test image or a coherent part of the first test image is divided into partial image areas.

10. The method as claimed in claim 3, wherein the first test image comprises a plurality of test image parts for which the evaluation device respectively calculates a first portion (A1), wherein the test image parts represent harvested material from different conveyor elements which convey away from a separating device.

11. The method as claimed in claim 3, wherein the image areas which form the first portion (A1) show root crop or parts thereof and image areas which form a second portion (A2) show extraneous materials or parts thereof.

12. The method as claimed in claim 3, wherein the cleaning characteristic value is determined by a deviation, calculated by the evaluation device, of the first portion (A1) from a threshold value (R).

13. The method as claimed in claim 3, wherein the separating device setting signal is calculated using a plurality of cleaning characteristic values (RS), which are calculated in chronological succession, or at least one previously calculated cleaning characteristic value (RS) is input into the calculation of the cleaning characteristic value (RS).

14. The method as claimed in claim 1, wherein at least one of a sensor for measuring a layer thickness of the harvested material on the conveyor element, a sensor for measuring the drive power level, a moisture sensor and a rotational speed sensor, transmits sensor data to the evaluation device which data is input into the calculation of the separating device setting signal.

15. The method as claimed in claim 1, wherein the evaluation device triggers either an increase or a reduction in the operating parameter by means of different separating device setting signals.

16. The method as claimed in claim 15, wherein, after the triggering of a change in an operating parameter, no further change in an operating parameter is triggered for a defined time period or a defined conveying distance of the conveyor element.

17. The method as claimed in claim 1, wherein the operating parameter is at least one of: a distance (H) between two conveyor elements, a distance between one separating element and the first conveyor element, and a distance between the separating device and the first conveyor element.

18. The method as claimed in claim 1, wherein the operating parameter is a separating speed of a separating element or of the separating device.

19. The method as claimed in claim 1, wherein the operating parameter is an attitude angle (a) of the conveyor element or of the separating device.

20. The method as claimed in claim 1, wherein the operating parameter is a motor power level and/or an attitude angle of an associated assembly.

21. The method as claimed in claim 1, wherein the separating device setting signal is transmitted in a wired fashion, in particular by means of CAN bus or ethernet, or in a wireless fashion, to a separating device control device.

22. The method as claimed in claim 1, wherein the separating device setting signal and/or the operating parameter is represented for an operator.

23. The method as claimed in claim 1, wherein the optical image-capturing units only acquire 1D or 2D information.

24. A machine for harvesting root crop and/or for separating root crop from further harvested material, the machine comprising:
at least one machine frame,
a first conveyor element,
a second conveyor element
a first image-capturing unit,
a second conveyor element, and
a separating device and an evaluation device, wherein the machine is operable to carry out the method as claimed in claim 1.

25. The machine as claimed in claim 24, wherein the evaluation device comprises a graphic processor unit.

26. The machine as claimed in claim 24, further including at least one sensor which is coupled to the evaluation device, wherein the sensor is at least one of an ultrasonic sensor or tactile sensor for measuring a layer thickness of the harvested material on the first conveyor element or the second conveyor element, a sensor for measuring a drive power level, a rotational speed sensor arranged on the first conveyor element and a moisture sensor.

27. The machine as claimed in claim 24, further including a plurality of image-capturing units which during operation each capture at least one test image of the same conveyor element or of the same separating device or of conveyor elements or separating devices which are different.

28. The machine as claimed in claim 24, wherein the first image-capturing unit is arranged in such a way that, during operation, the test image respectively at least partially represents at least two conveyor element sections which are separated by at least one separating element.

29. The machine as claimed in claim 24, wherein the first image-capturing unit is arranged in such a way that the test image shows at least two conveyor elements, forming alternative conveying paths, of the machine for different components of the harvested material.

30. The machine as claimed in claim 24, wherein the first conveyor element is embodied as a screening belt or as a hedgehog web.

* * * * *